US012680397B2

(12) United States Patent
Wahlgren

(10) Patent No.: US 12,680,397 B2
(45) Date of Patent: Jul. 14, 2026

(54) STACKABLE FLOAT ASSEMBLY

(71) Applicant: Eddy Pump Corporation, El Cajon, CA (US)

(72) Inventor: Daniel Wahlgren, Escondido, CA (US)

(73) Assignee: Eddy Pump Corporation

( * ) Notice: Subject to any disclaimer, the term of this patent is extended or adjusted under 35 U.S.C. 154(b) by 0 days.

(21) Appl. No.: 18/419,863

(22) Filed: Jan. 23, 2024

(65) Prior Publication Data

US 2024/0159112 A1      May 16, 2024

Related U.S. Application Data

(63) Continuation of application No. 17/832,827, filed on Jun. 6, 2022, which is a continuation-in-part of application No. 17/668,099, filed on Feb. 9, 2022, now Pat. No. 11,834,910.

(51) Int. Cl.
  *E21B 17/01*        (2006.01)
  *F16L 1/24*         (2006.01)

(52) U.S. Cl.
  CPC .............. *E21B 17/012* (2013.01); *F16L 1/24* (2013.01)

(58) Field of Classification Search
  CPC .......... E21B 17/012; E21B 17/01; F16L 1/24; F16L 1/20; E02B 17/0017; E02B 2017/0095; B63B 22/00; B63B 22/021
  USPC .............. 441/133, 1; 405/171, 216; 166/350
  See application file for complete search history.

(56) References Cited

U.S. PATENT DOCUMENTS

| | | | | |
|---|---|---|---|---|
| 3,594,835 A | * | 7/1971 | Wilson ..................... | F16L 1/163 |
| | | | | 441/133 |
| 4,477,207 A | * | 10/1984 | Johnson ................ | E21B 17/012 |
| | | | | 166/359 |
| 5,094,422 A | * | 3/1992 | Tiffany ..................... | F42B 4/20 |
| | | | | 248/346.03 |
| 6,004,074 A | | 12/1999 | Shanks, II | |
| 6,155,748 A | | 12/2000 | Allen et al. | |
| 6,241,425 B1 | | 6/2001 | Kazim | |
| 6,402,431 B1 | * | 6/2002 | Nish ..................... | E21B 17/012 |
| | | | | 405/224.3 |
| 7,328,747 B2 | * | 2/2008 | Jones ..................... | E21B 17/012 |
| | | | | 405/224.4 |
| 8,152,581 B2 | * | 4/2012 | Kato ....................... | B63B 27/24 |
| | | | | 441/13 |

(Continued)

FOREIGN PATENT DOCUMENTS

| | | | | |
|---|---|---|---|---|
| GB | 2479634 A | * | 10/2011 | ......... B65D 21/0201 |
| WO | 2016191490 A1 | | 12/2016 | |

OTHER PUBLICATIONS

European Search Report issued Jul. 10, 2023 in corresponding European Application No. 22215507.9.

*Primary Examiner* — Tara Schimpf
*Assistant Examiner* — Patrick F Lambe
(74) *Attorney, Agent, or Firm* — Spencer Fane, LLP

(57)        ABSTRACT

A float includes a body portion having a first side surface and a second side surface, an inner surface and an outer surface, the first and second side surfaces being generally planar and forming an acute angle therebetween, the inner and outer surfaces being non-planar, and the body portion configured such that when positioned laterally adjacent an inverted second float and vertically adjacent a third float, the first side surface of the float abuts a surface of the inverted second (Continued)

float, and the inner surface of the float engages an outer surface of the third float.

20 Claims, 27 Drawing Sheets

(56)               References Cited

U.S. PATENT DOCUMENTS 9,316,064  B2      4/2016   Patriciu

* cited by examiner

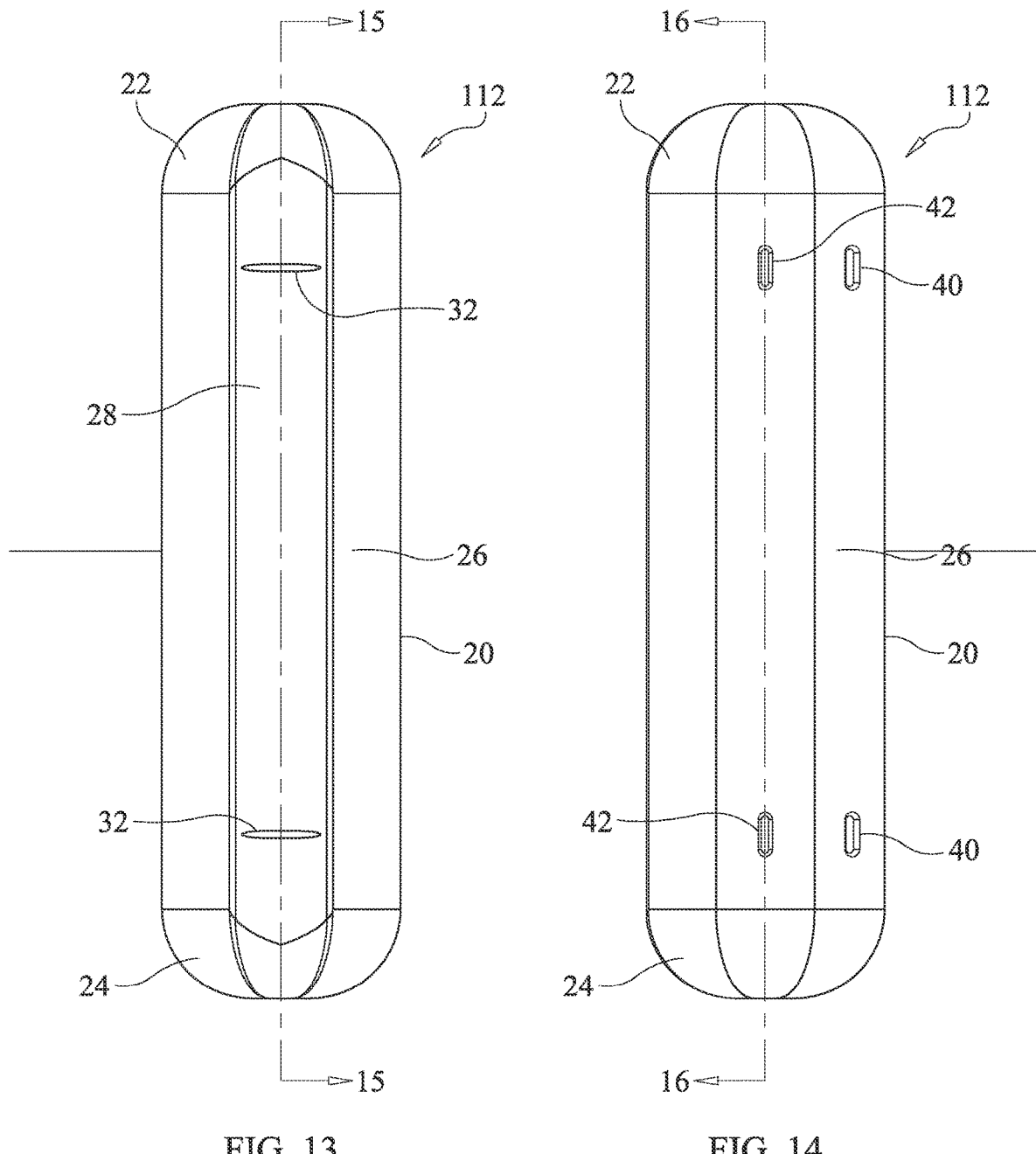
FIG. 13                                    FIG. 14

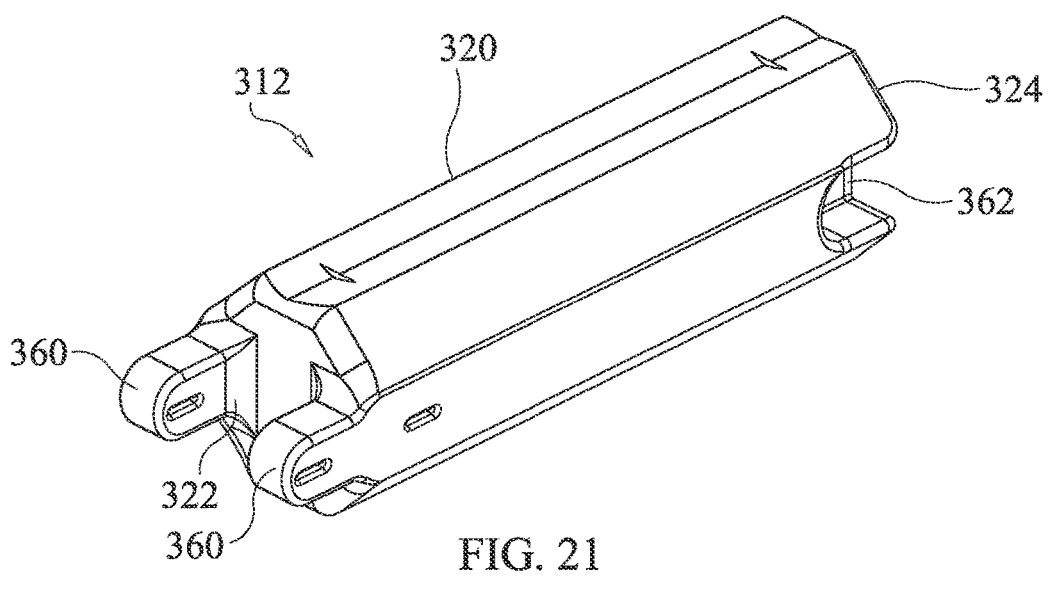
FIG. 21
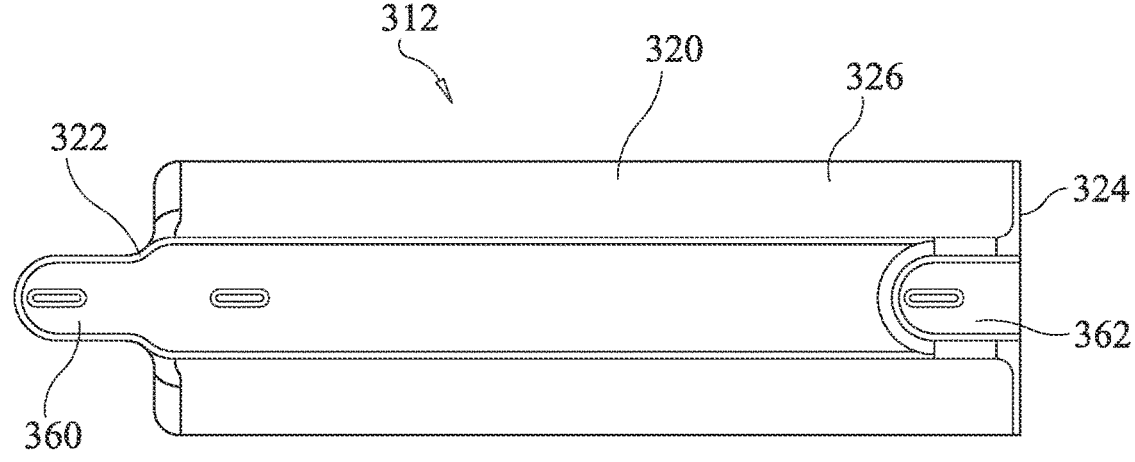
FIG. 22
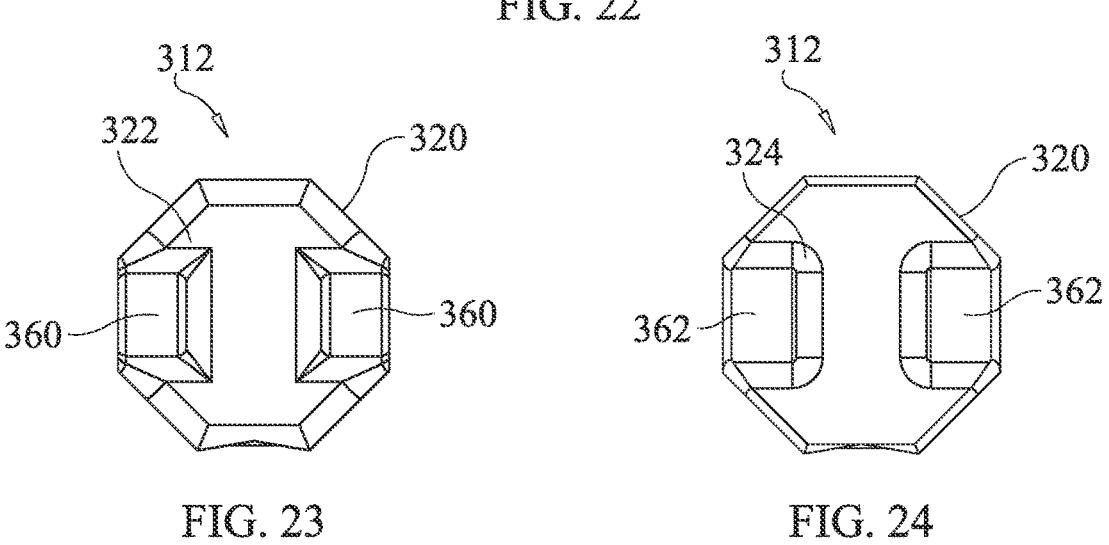
FIG. 23            FIG. 24

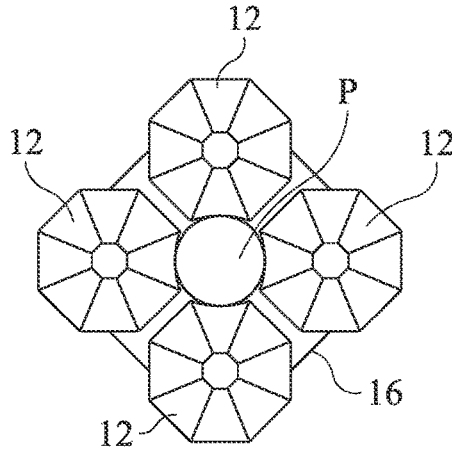
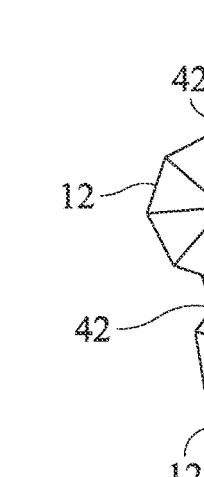
FIG. 25
FIG. 26
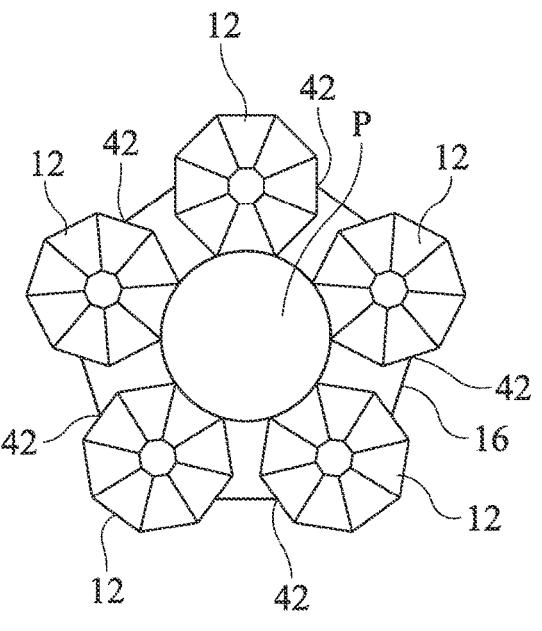
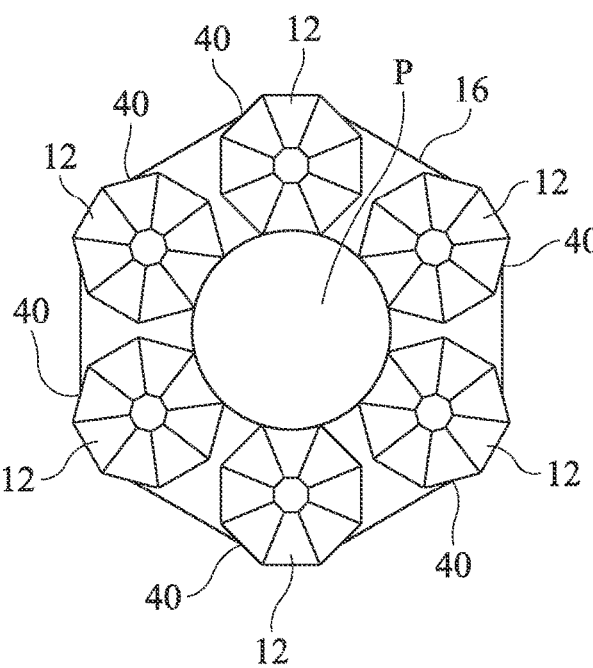
FIG. 27
FIG. 28

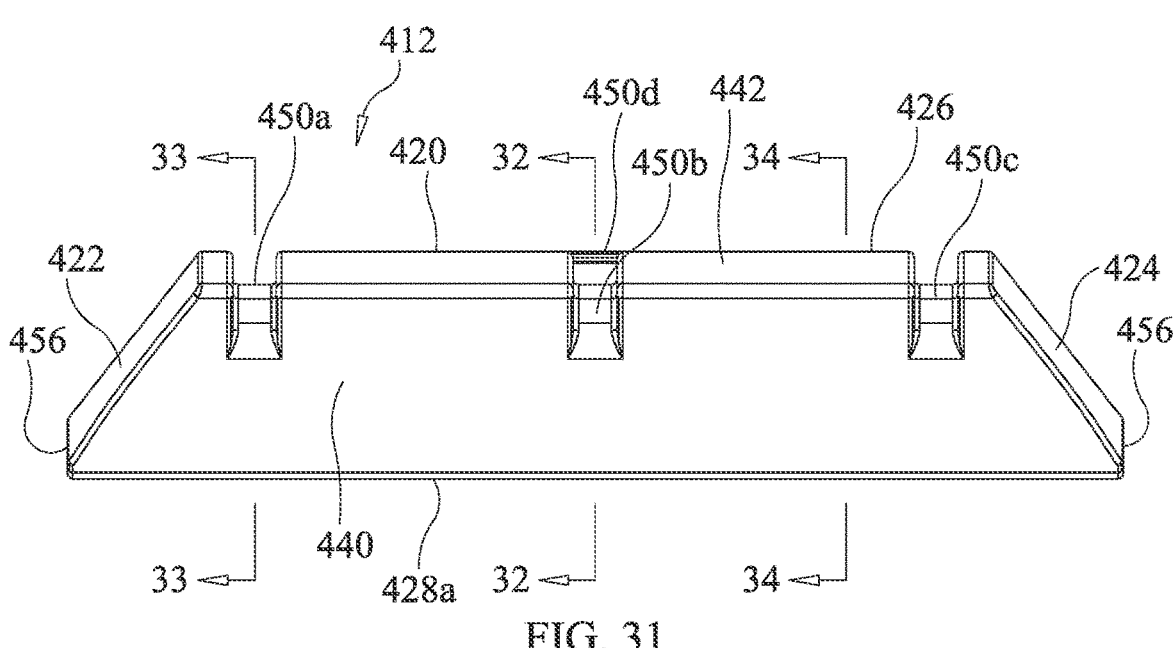
FIG. 31
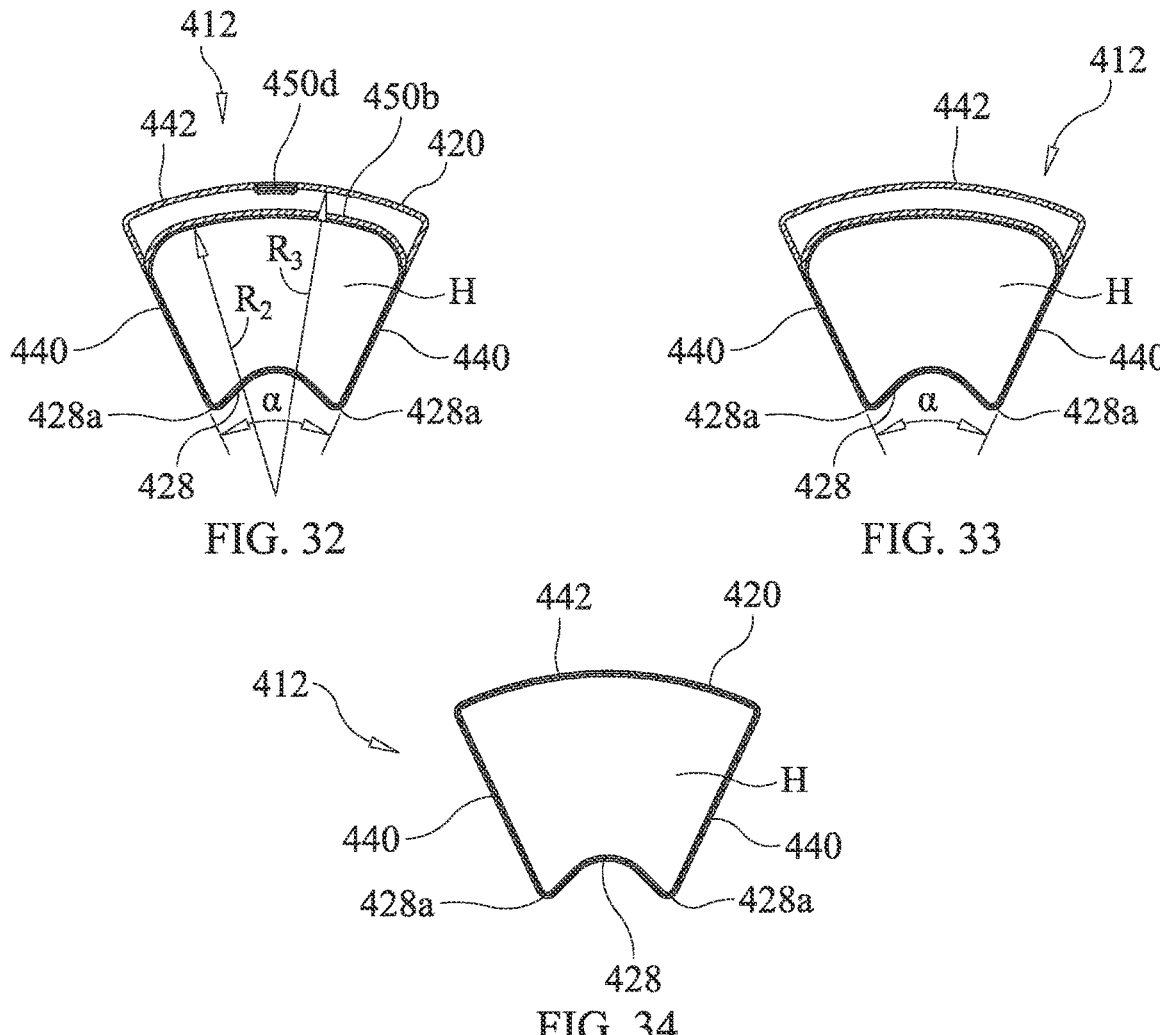
FIG. 32
FIG. 33
FIG. 34

450a

S₁

450b

S₁

412

450c

S₁

P₁₁

412

P₁₁         S₁

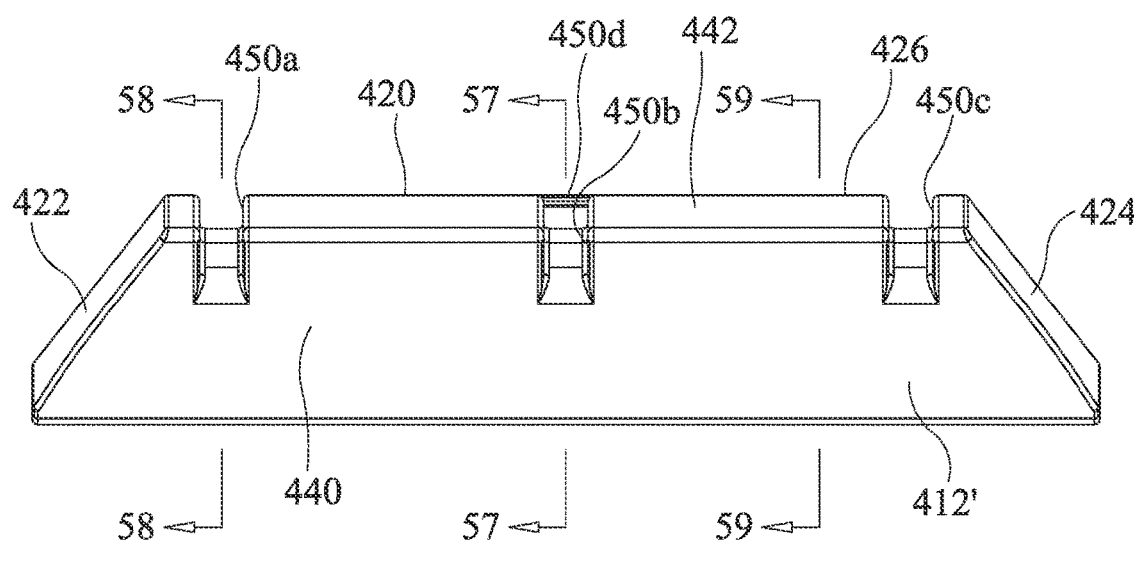
FIG. 56
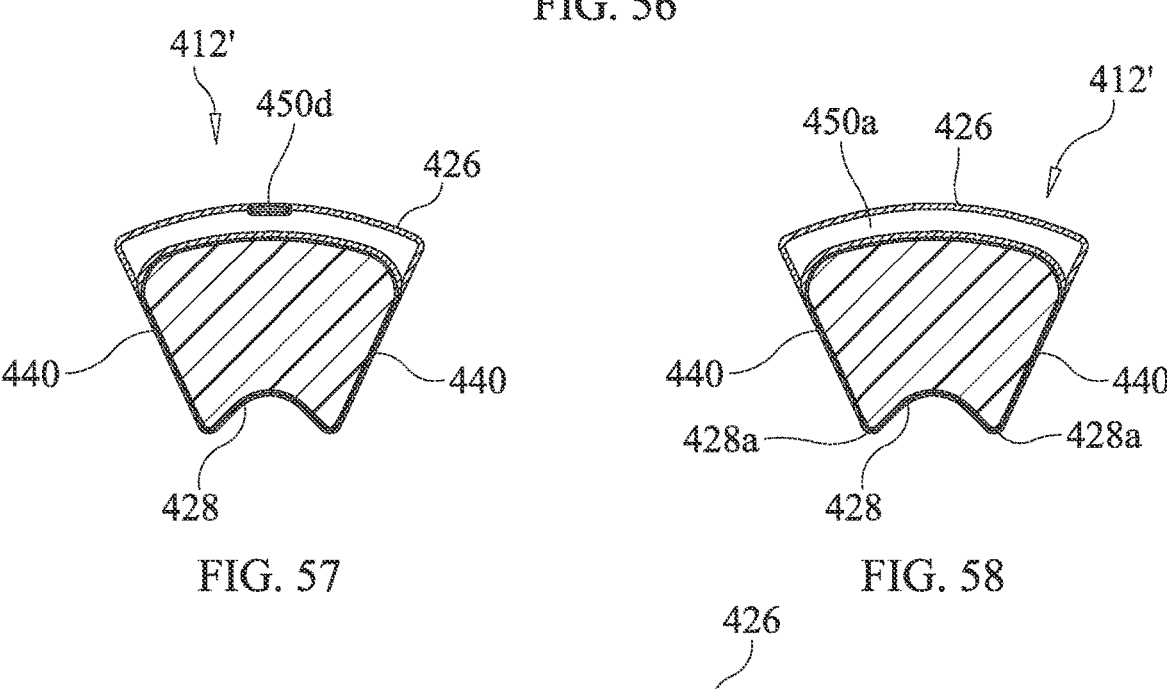
FIG. 57          FIG. 58
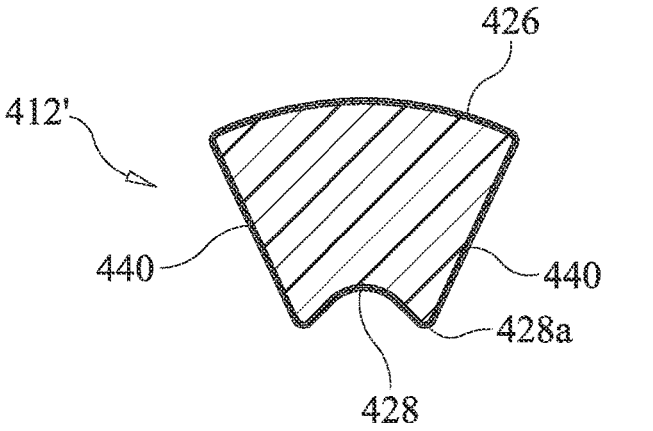
FIG. 59

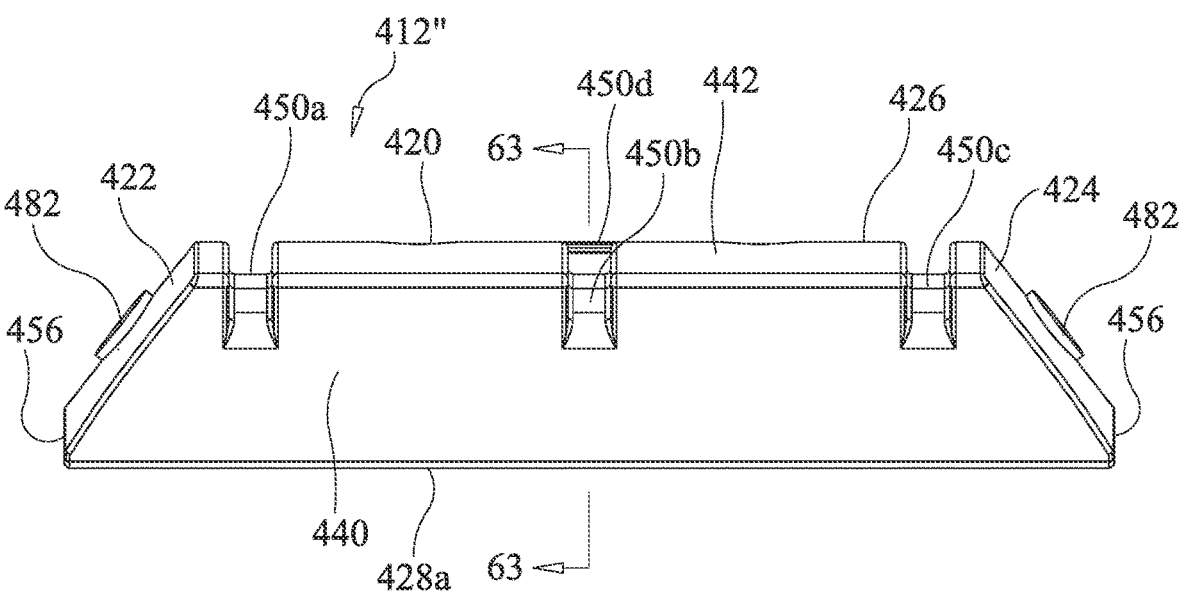
FIG. 62
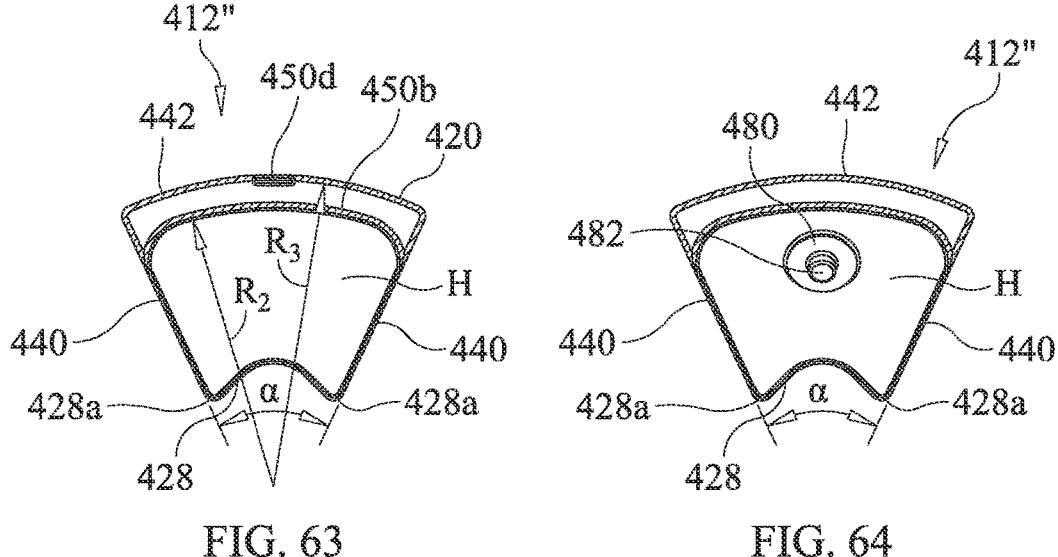
FIG. 63                    FIG. 64

STACKABLE FLOAT ASSEMBLY

CROSS-REFERENCE TO RELATED APPLICATIONS

This U.S. patent application is a continuation of U.S. patent Ser. No. 17/832,827, filed on Jun. 6, 2022, which is continuation-in-part of U.S. patent Ser. No. 17/668,099, filed on Feb. 9, 2022, the entire contents of each of which are hereby incorporated herein by reference.

BACKGROUND

Technical Field

The present disclosure generally relates to a float device or assembly. More specifically, the present disclosure relates to float device that is capable of being stacked to form an assembly with a plurality of floats devices.

Background Information

Many types of conduits are used in a large body of liquid and extend from a deep portion of the body of liquid to above the surface of the body of liquid or traverse the liquid. In some applications, the conduit requires added buoyancy to keep a portion of the conduit near or above the surface of the body of liquid.

SUMMARY

One object of the present disclosure is to provide a float device that is simple to install around a conduit and includes a surface section that receives and mates with a portion of the outer surface of the conduit. This outer surface also enables the float device to stack with other floats devices to form a stacked assembly.

In view of the state of the known technology, one aspect of the present disclosure is to provide a float includes a body portion having a first side surface and a second side surface, an inner surface and an outer surface, the first and second side surfaces being generally planar and forming an acute angle therebetween, the inner and outer surfaces being non-planar, and the body portion configured such that when positioned laterally adjacent an inverted second float and vertically adjacent a third float, the first side surface of the float abuts a surface of the inverted second float, and the inner surface of the float engages an outer surface of the third float.

Another aspect of the present disclosure is to provide a float assembly, comprising a plurality of floats, each of the plurality of floats having a first side surface and a second side surface, an inner surface and an outer surface, the first and second side surfaces being generally planar and forming an acute angle therebetween, the inner and outer surfaces being non-planar, and a first float of the plurality of floats being configured such that when positioned laterally adjacent an inverted second float of the plurality of floats and vertically adjacent a third float of the plurality of floats, the first side surface of the first float abuts one of the second surface and the first side surface of the inverted second float, and the inner surface of the first float engages the outer surface of the third float.

BRIEF DESCRIPTION OF THE DRAWINGS

Referring now to the attached drawings which form a part of this original disclosure:

FIG. 13 is a first side view of a buoyant device showing the outer surface, the first end, the second end, the elongated portion, the concaved area and the pair of projections within the concaved area in accordance with a second embodiment;

FIG. 14 is a second side view of the buoyant device depicted in FIG. 13 showing the outer surface, the first end, the second end, and first and second strap receiving tunnels in accordance with the second embodiment;

Figures 17, 18, 19:
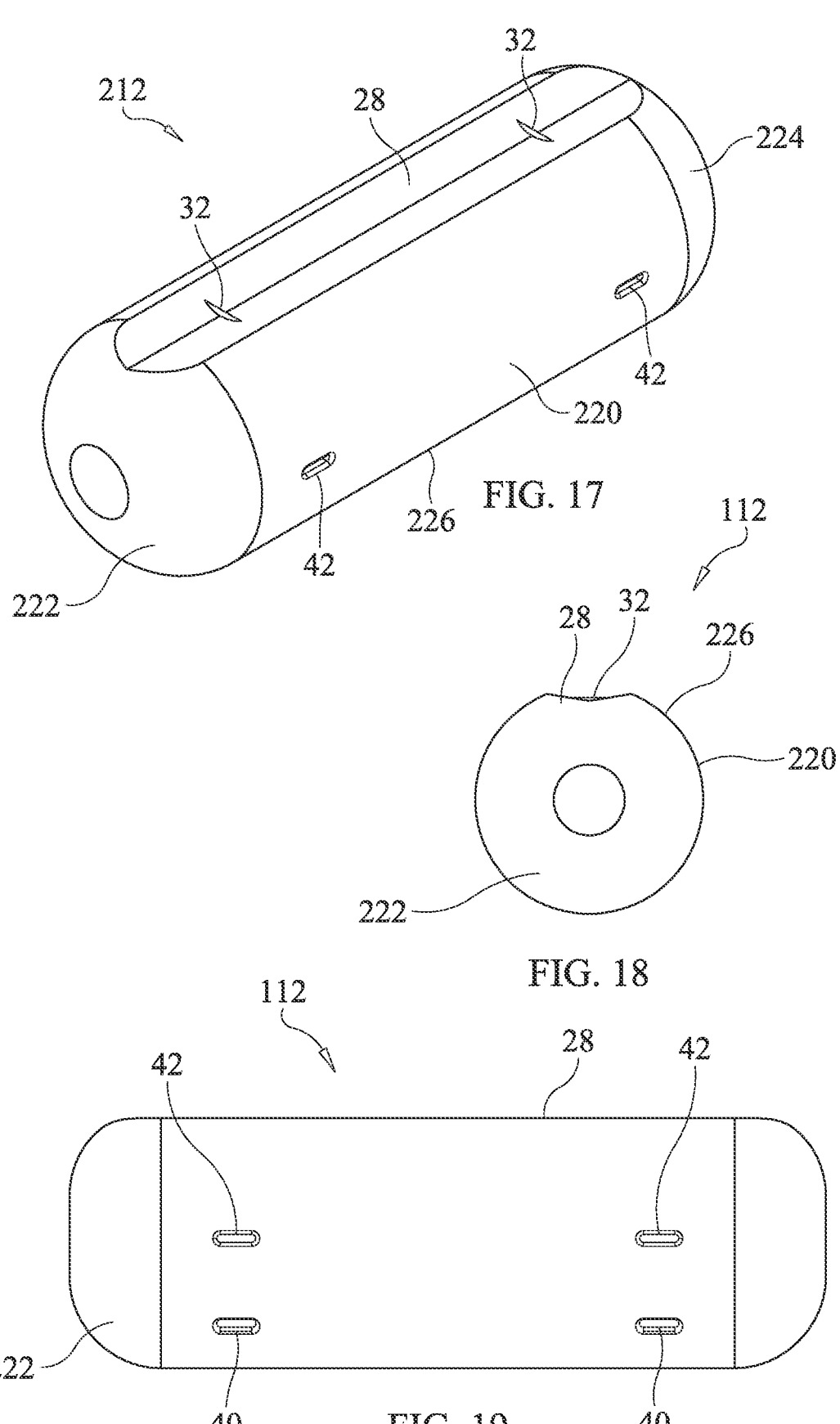
Figure 20:
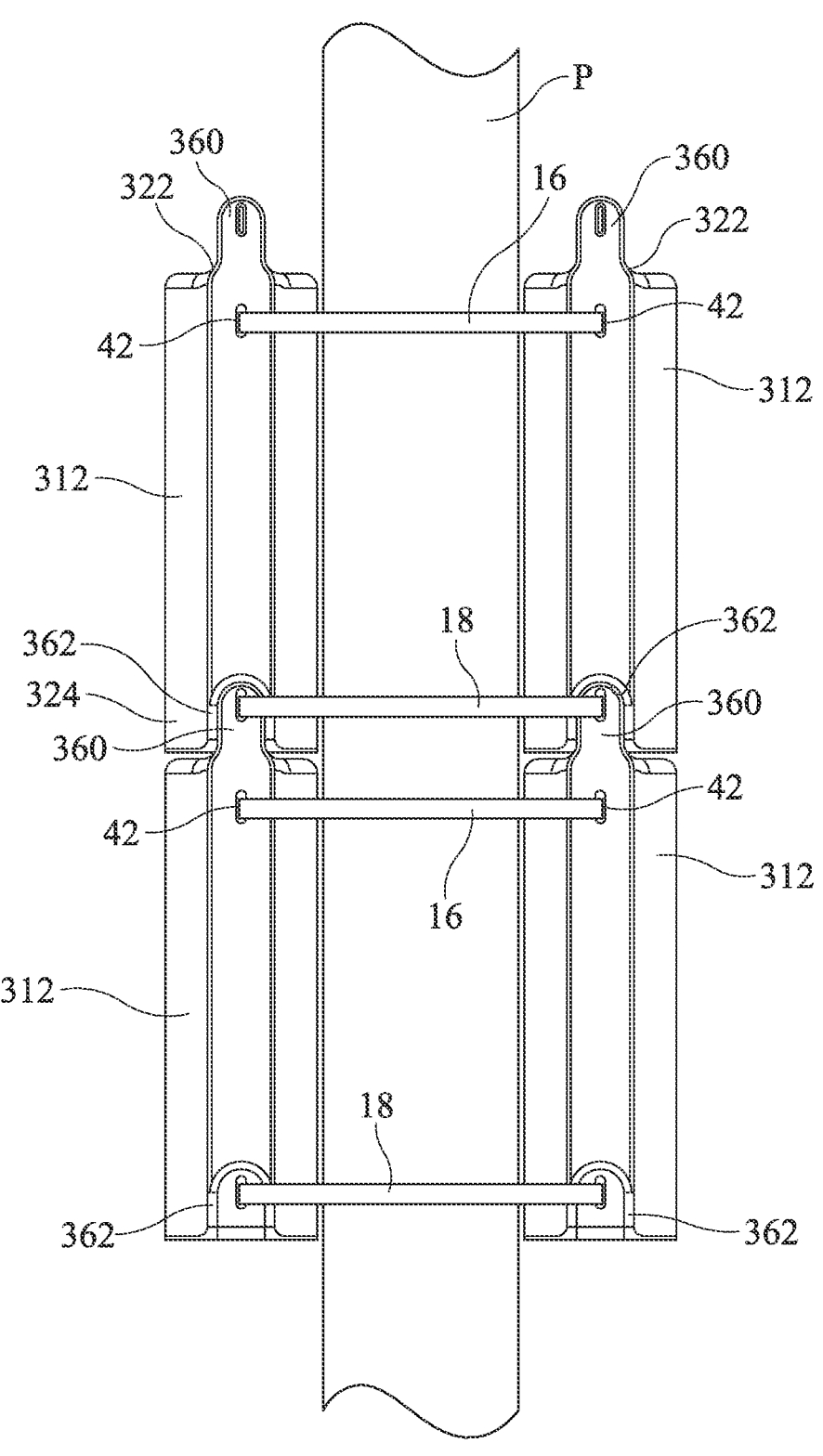
Figures 29, 30:
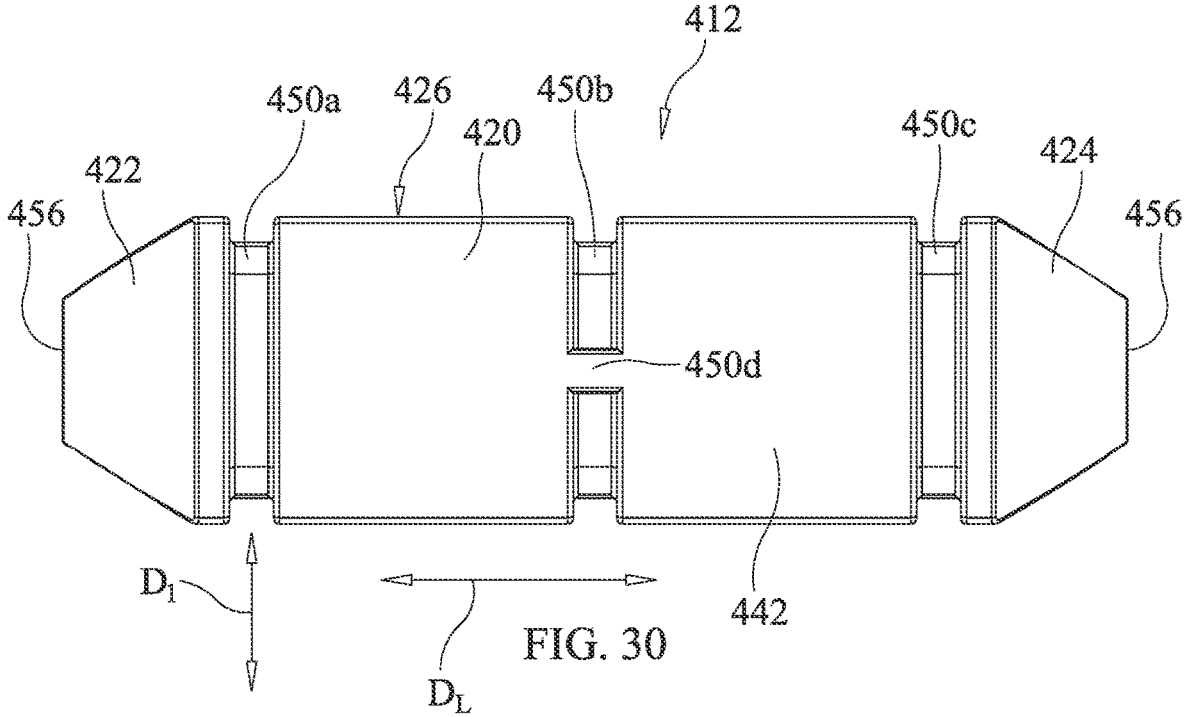
Figure 35:
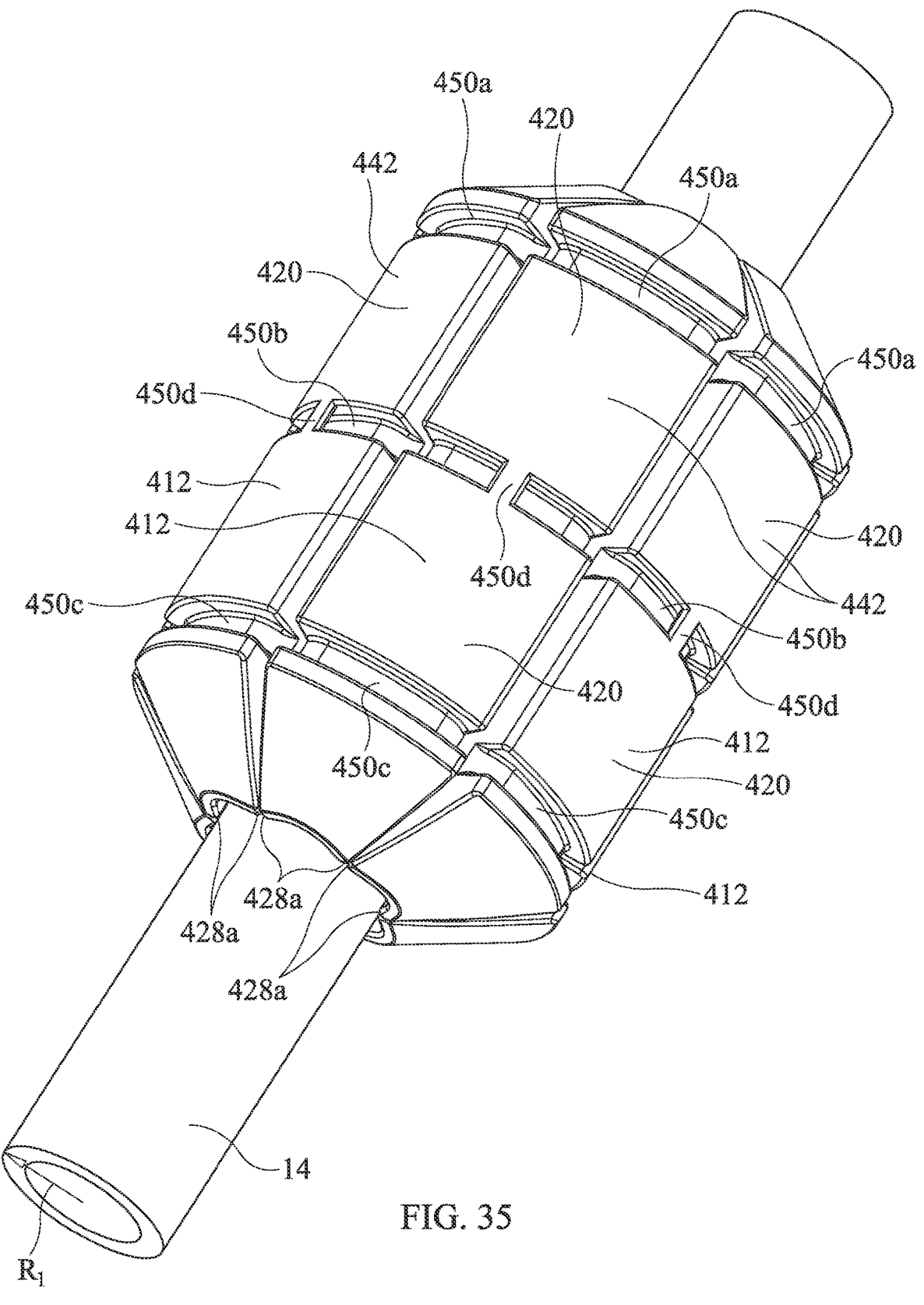
Figures 36, 37, 38:
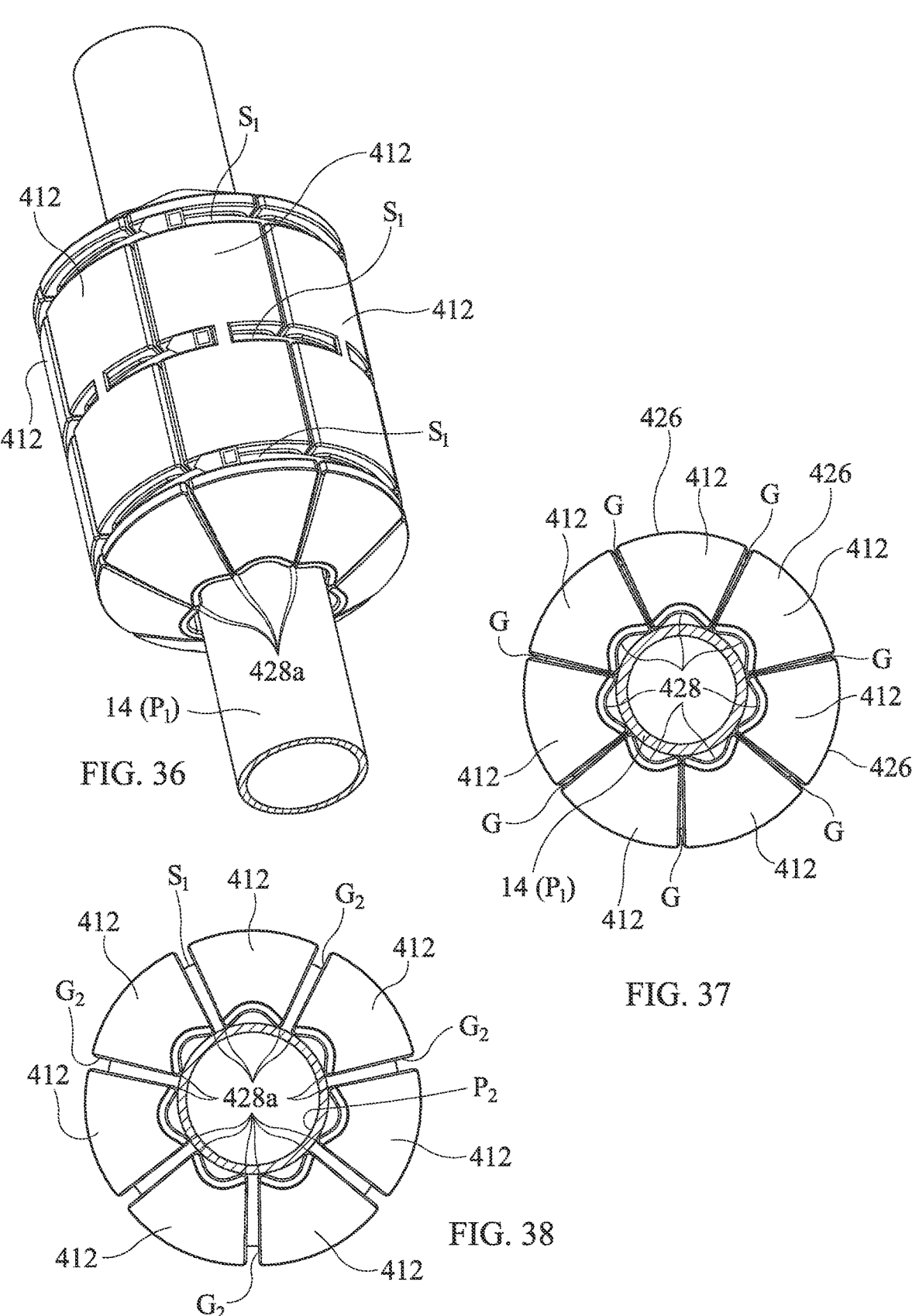

3 tunnels that extend through the buoyant device in accordance with the second embodiment;

FIG. 17 is a perspective view of a buoyant device having an overall smooth surface in accordance with a third embodiment;

FIG. 18 is an end view of the buoyant device having the overall smooth surface in accordance with the third embodiment;

FIG. 19 is a side view of the buoyant device having the overall smooth surface in accordance with the third embodiment;

FIG. 20 is a side view of a conduit and a plurality of buoyant devices attached to the conduit in accordance with a fourth embodiment;

FIG. 21 is a perspective view of one of the buoyant devices depicted in FIG. 20 showing a pair of attachment projections at a first end thereof and a pair of recesses at a second end thereof in accordance with the fourth embodiment;

FIG. 22 is a side view of the buoyant device depicted in FIG. 21 showing the pair of attachment projections and the pair of recesses in accordance with the fourth embodiment;

FIG. 23 is a first end view of the buoyant device depicted in FIGS. 21 and 21 showing the projections in accordance with the fourth embodiment;

FIG. 24 is a second end view of the buoyant device depicted in FIGS. 20-23 showing the recesses in accordance with the fourth embodiment;

FIG. 25 is an end view of a conduit with four of the buoyant devices strapped thereto in accordance with a fifth embodiment;

FIG. 26 is an end view of a conduit with five of the buoyant devices strapped thereto in accordance with a sixth embodiment;

FIG. 27 is an end view of a conduit with five of the buoyant devices strapped thereto in accordance with a seventh embodiment;

FIG. 28 is an end view of a conduit with six of the buoyant devices strapped thereto in accordance with an eighth embodiment;

FIG. 29 is a perspective view of a buoyant device in accordance with a nineth embodiment;

FIG. 30 is a top view of the buoyant device depicted in FIG. 29 in accordance with the nineth embodiment;

FIG. 31 is a side view of the buoyant device depicted in FIGS. 29-30 in accordance with the nineth embodiment;

FIG. 32 is a cross-sectional view of the buoyant device taken along the line 32-32 in FIG. 31 in accordance with the nineth embodiment;

FIG. 33 is another cross-sectional view of the buoyant device taken along the line 33-33 in FIG. 31 in accordance with the nineth embodiment;

FIG. 34 is yet another cross-sectional view of the buoyant device taken along the line 34-34 in FIG. 31 in accordance with the nineth embodiment;

FIG. 35 is a perspective view of an assembly that includes seven of the buoyant devices placed around a conduit prior to attachment to the conduit in accordance with the nineth embodiment;

FIG. 36 is another perspective view of the assembly showing the seven buoyant devices strapped to and encircling the conduit in accordance with the nineth embodiment;

FIG. 37 is an end view of the assembly showing the seven buoyant devices strapped to and surrounding the conduit showing small gaps between adjacent ones of the buoyant devices in accordance with the nineth embodiment;

4

Figures 39, 40, 41:
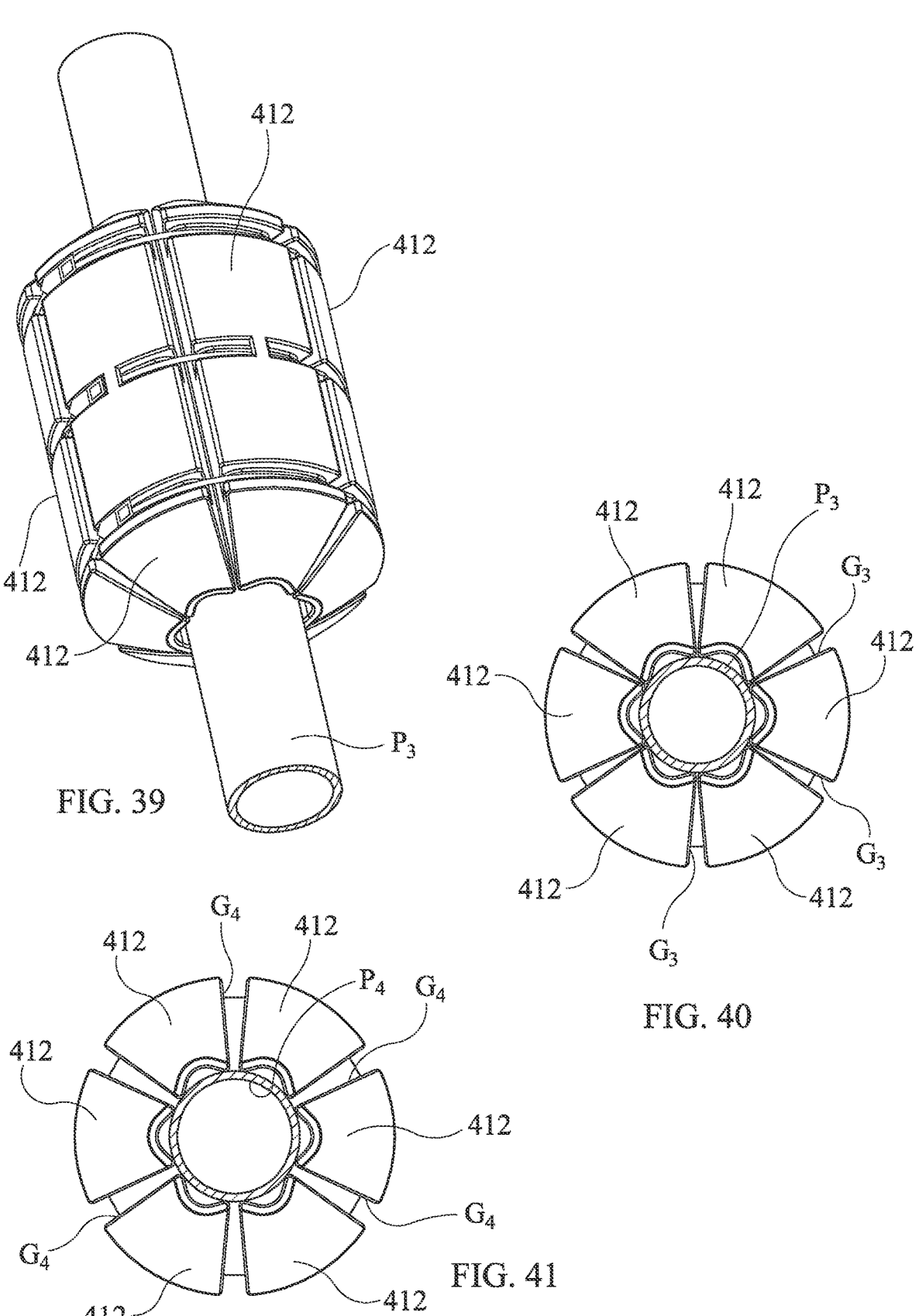
Figures 42, 43, 44:
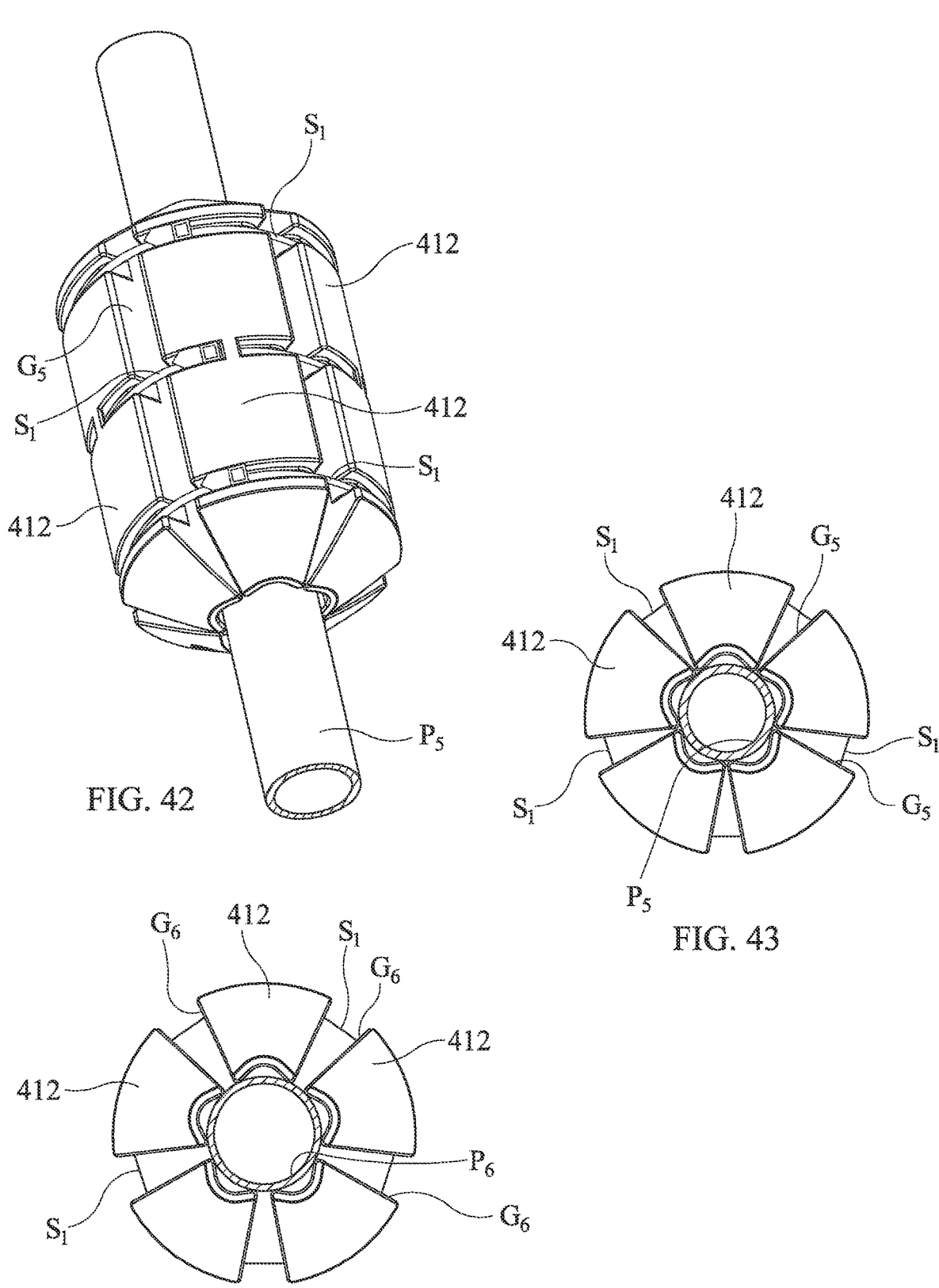
Figure 45:
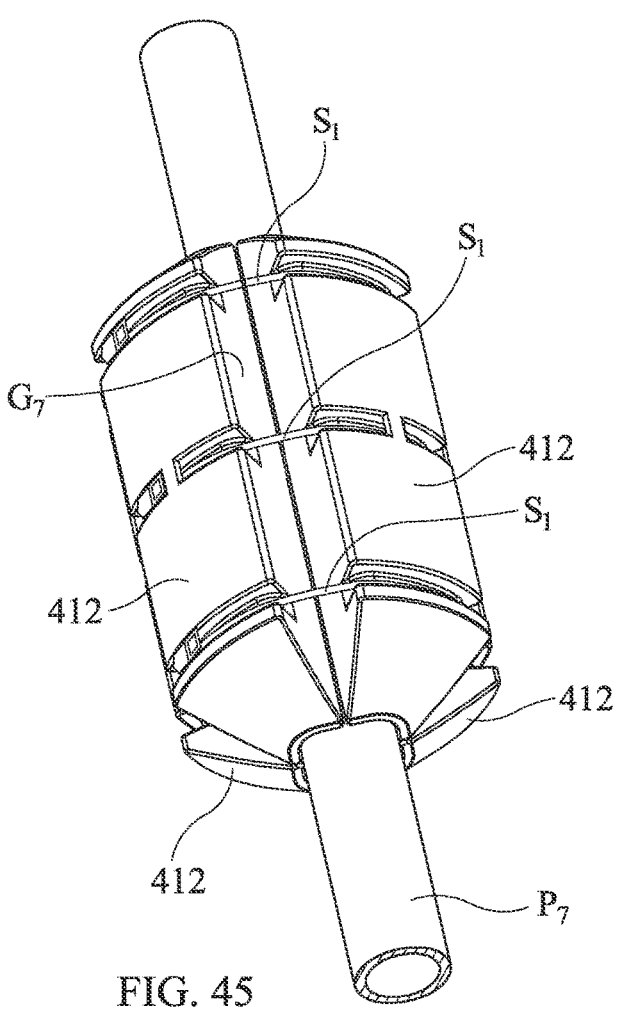
Figure 46:
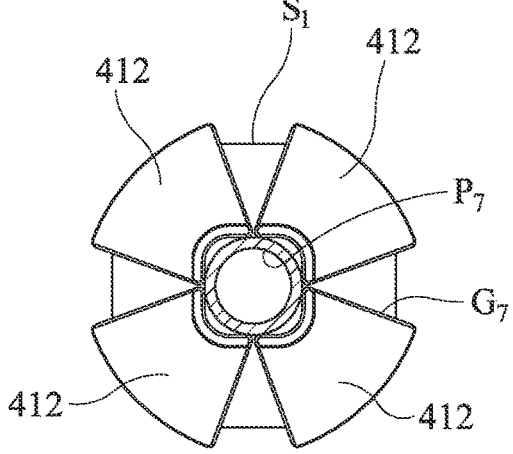
Figure 47:
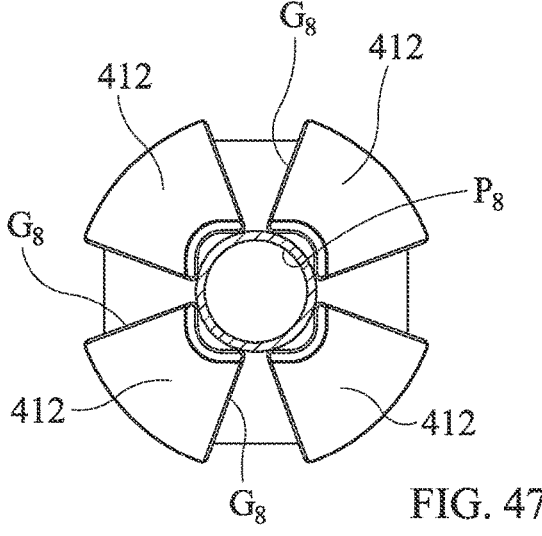
Figure 48:
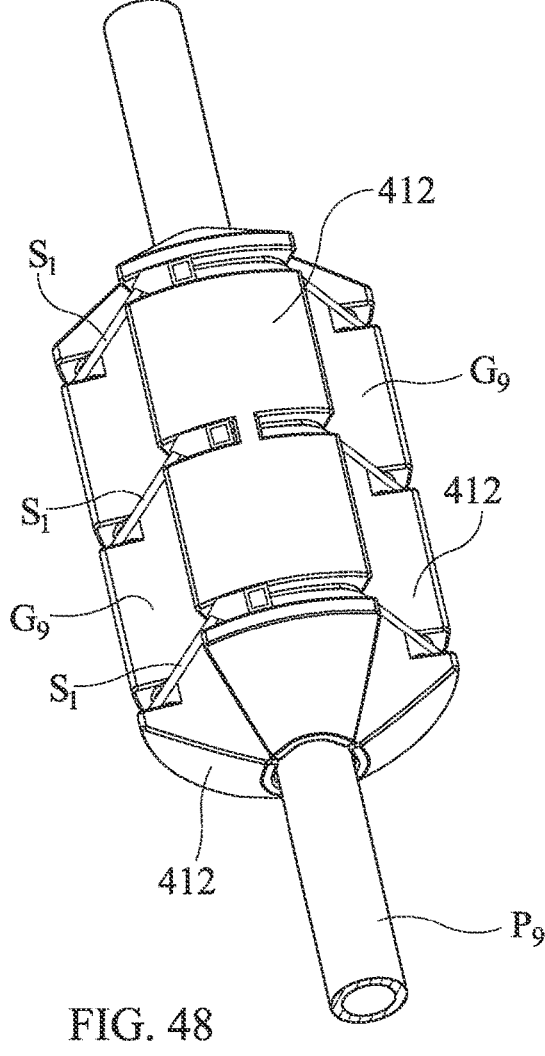
Figure 49:
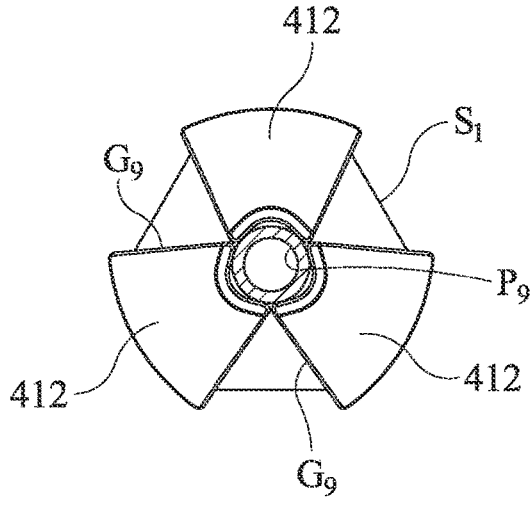
Figure 50:
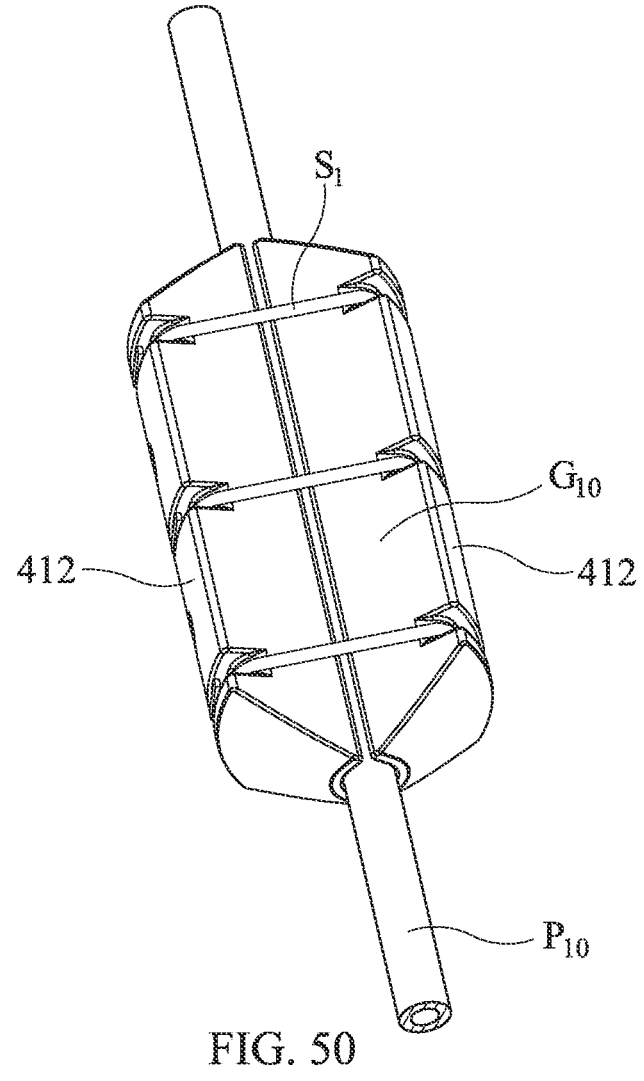
Figure 51:
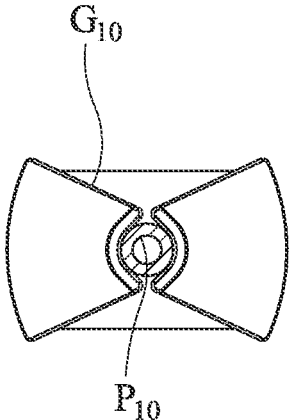
Figure 52:
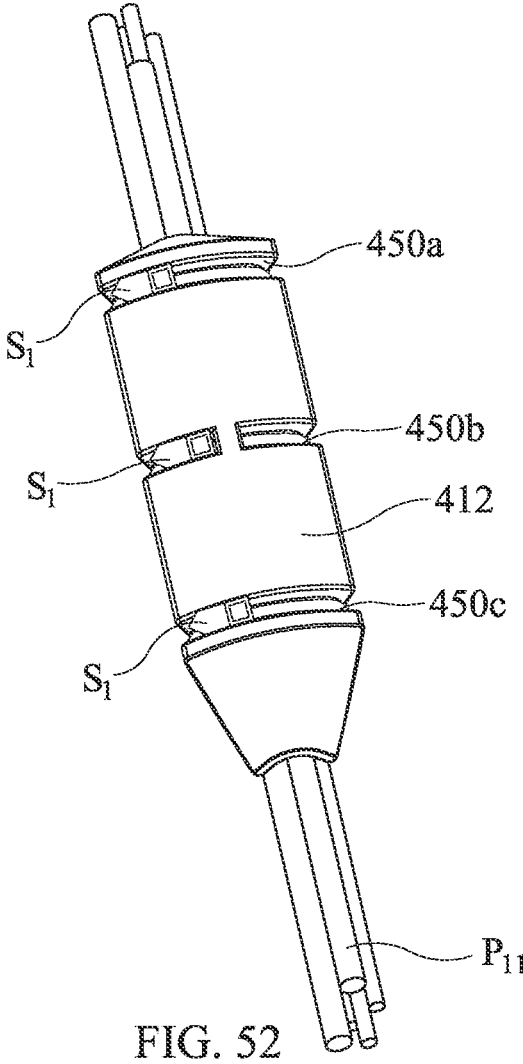
Figure 53:
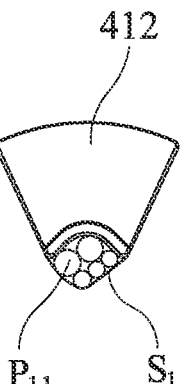
Figures 54, 55:
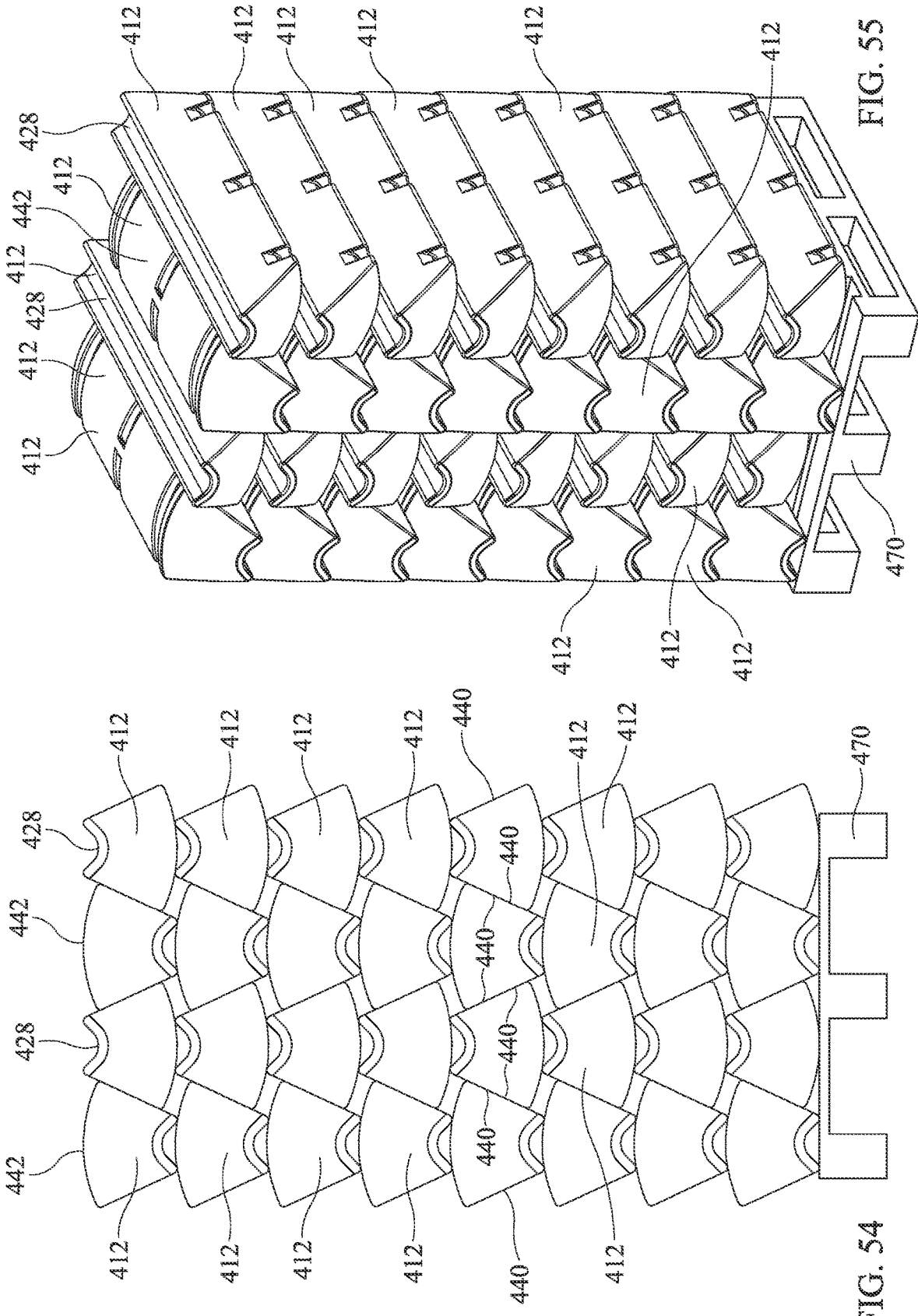
Figures 60, 61:
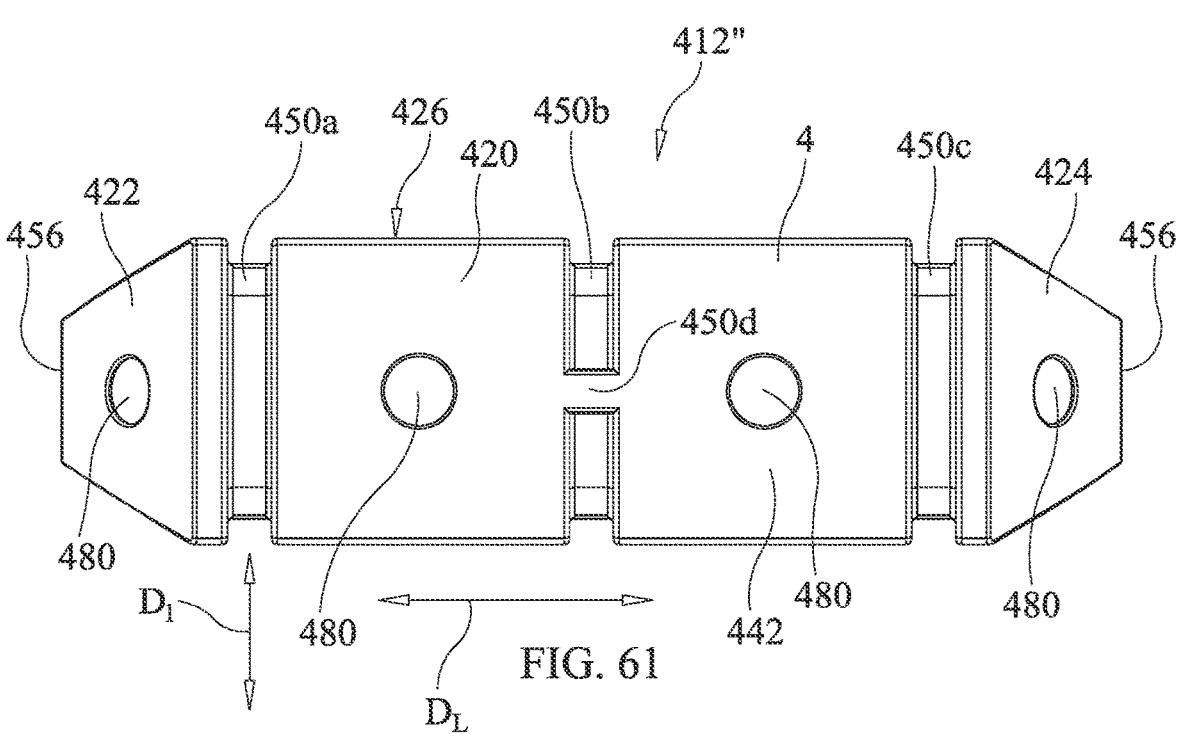

FIG. 38 is an end view of the assembly showing seven buoyant devices strapped to and surrounding a conduit that is slightly larger than the conduit shown in FIGS. 36 and 37 such that gaps are defined between adjacent ones of the buoyant devices, the gaps in FIG. 38 being slightly larger than the gaps shown in FIG. 37 in accordance with the nineth embodiment;

FIG. 39 is another perspective view of an assembly showing six buoyant devices strapped to and encircling a conduit, the conduit having a diameter (and radius) that is smaller than the conduit depicted in FIG. 37 in accordance with the nineth embodiment;

FIG. 40 is an end view of the assembly depicted in FIG. 39 showing the six buoyant devices strapped to and surrounding the conduit showing small gaps between adjacent ones of the buoyant devices in accordance with the nineth embodiment;

FIG. 41 is an end view of an assembly showing the six buoyant devices strapped to and surrounding a conduit that is slightly larger than the conduit shown in FIG. 40 such that gaps are defined between adjacent ones of the buoyant devices, the gaps in FIG. 41 being slightly larger than the gaps shown in FIG. 40 in accordance with the nineth embodiment;

FIG. 42 is another perspective view of an assembly showing five buoyant devices strapped to and encircling a conduit, the conduit having a diameter (and radius) that is smaller than the conduit depicted in FIG. 40 in accordance with the nineth embodiment;

FIG. 43 is an end view of the assembly depicted in FIG. 42 showing the five buoyant devices strapped to and surrounding the conduit showing small gaps between adjacent ones of the buoyant devices in accordance with the nineth embodiment;

FIG. 44 is an end view of an assembly showing the five buoyant devices strapped to and surrounding a conduit that is slightly larger than the conduit shown in FIG. 43 such that gaps are defined between adjacent ones of the buoyant devices, the gaps in FIG. 44 being slightly larger than the gaps shown in FIG. 43 in accordance with the nineth embodiment;

FIG. 45 is another perspective view of an assembly showing four buoyant devices strapped to and encircling a conduit, the conduit having a diameter (and radius) that is smaller than the conduit depicted in FIG. 43 in accordance with the nineth embodiment;

FIG. 46 is an end view of the assembly depicted in FIG. 45 showing the four buoyant devices strapped to and surrounding the conduit showing gaps between adjacent ones of the buoyant devices in accordance with the nineth embodiment;

FIG. 47 is an end view of an assembly showing the four buoyant devices strapped to and surrounding a conduit that is slightly larger than the conduit shown in FIG. 46 such that gaps are defined between adjacent ones of the buoyant devices, the gaps in FIG. 47 being slightly larger than the gaps shown in FIG. 46 in accordance with the nineth embodiment;

FIG. 48 is a perspective view of an assembly showing three buoyant devices strapped to and encircling a conduit, the conduit having a diameter (and radius) that is smaller than the conduit depicted in FIG. 46 in accordance with the nineth embodiment;

FIG. 49 is an end view of the assembly depicted in FIG. 48 showing the three buoyant devices strapped to and surrounding the conduit showing gaps between adjacent ones of the buoyant devices in accordance with the nineth embodiment;

FIG. 50 is a perspective view of an assembly showing two buoyant devices strapped to opposite sides of a conduit, the conduit having a diameter (and radius) that is smaller than the conduit depicted in FIG. 49 in accordance with the nineth embodiment;

FIG. 51 is an end view of the assembly depicted in FIG. 50 showing the two buoyant devices strapped to and surrounding the conduit showing large gaps between adjacent ones of the buoyant devices in accordance with the nineth embodiment;

FIG. 52 is a perspective view of an assembly showing one buoyant device strapped to an array of conduits, the conduits all having a diameter (and radius) that is smaller than the conduit depicted in FIG. 51 in accordance with the nineth embodiment;

FIG. 53 is an end view of the assembly depicted in FIG. 52 showing the one buoyant device strapped to the conduits in accordance with the nineth embodiment;

FIG. 54 is an end view of a pallet or cargo carrier with rows of buoyant devices stacked thereon for shipping, each row of buoyant devices including alternating ones of upside up and upside down for efficient use of space on the pallet or cargo carrier in accordance with the nineth embodiment;

FIG. 55 is a perspective view of the pallet or cargo carrier with the rows of buoyant devices stacked thereon for shipping, in accordance with the nineth embodiment;

FIG. 56 is a side view of a buoyant device in accordance with a tenth embodiment;

FIG. 57 is a cross-sectional view of the buoyant device taken along the line 57-57 in FIG. 56 in accordance with the tenth embodiment;

FIG. 58 is another cross-sectional view of the buoyant device taken along the line 58-58 in FIG. 56 in accordance with the tenth embodiment;

FIG. 59 is yet another cross-sectional view of the buoyant device taken along the line 59-59 in FIG. 56 in accordance with the tenth embodiment;

FIG. 60 is a perspective view of a buoyant device showing concaved areas dimensioned to receive lights or beacons on various surfaces thereof in accordance with an eleventh embodiment;

FIG. 61 is a top view of the buoyant device depicted in FIG. 60 showing the concaved areas in accordance with the nineth embodiment;

FIG. 62 is a side view of the buoyant device depicted in FIGS. 60-61 in accordance with the nineth embodiment;

FIG. 63 is a cross-sectional view of the buoyant device taken along the line 63-63 in FIG. 62 in accordance with the nineth embodiment; and FIG. 64 is an end view of the buoyant device taken in accordance with the nineth embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
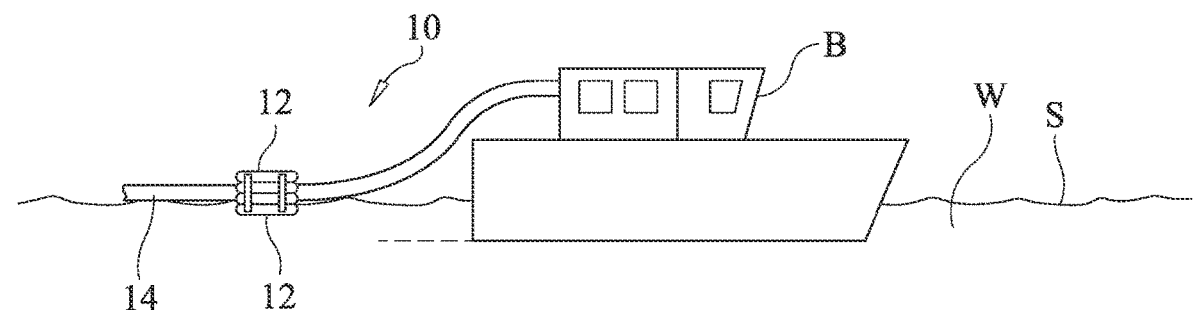
FIG. 1 is a schematic diagram of float used with a large boat to bring fluid or slurry from a body of liquid to the surface of the liquid via a conduit that includes a plurality of buoyant devices attached to and surrounding the conduit in accordance with a first embodiment.
Figure 2:
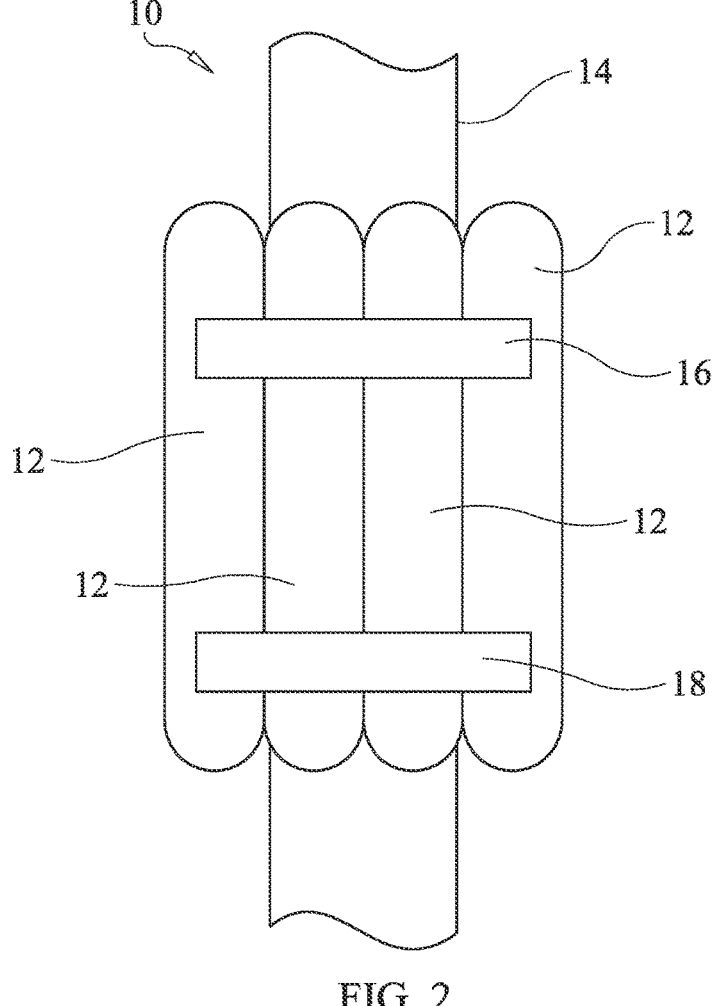
FIG. 2 is an enlarged portion of FIG. 1 showing the conduit with the plurality of buoyant devices strapped to the conduit in accordance with the first embodiment.

Referring initially to FIGS. 1 and 2, a float assembly 10 having at least one buoyant or float device 12 configured to attach to a conduit 14 is illustrated in accordance with a first embodiment.

Figure 3:
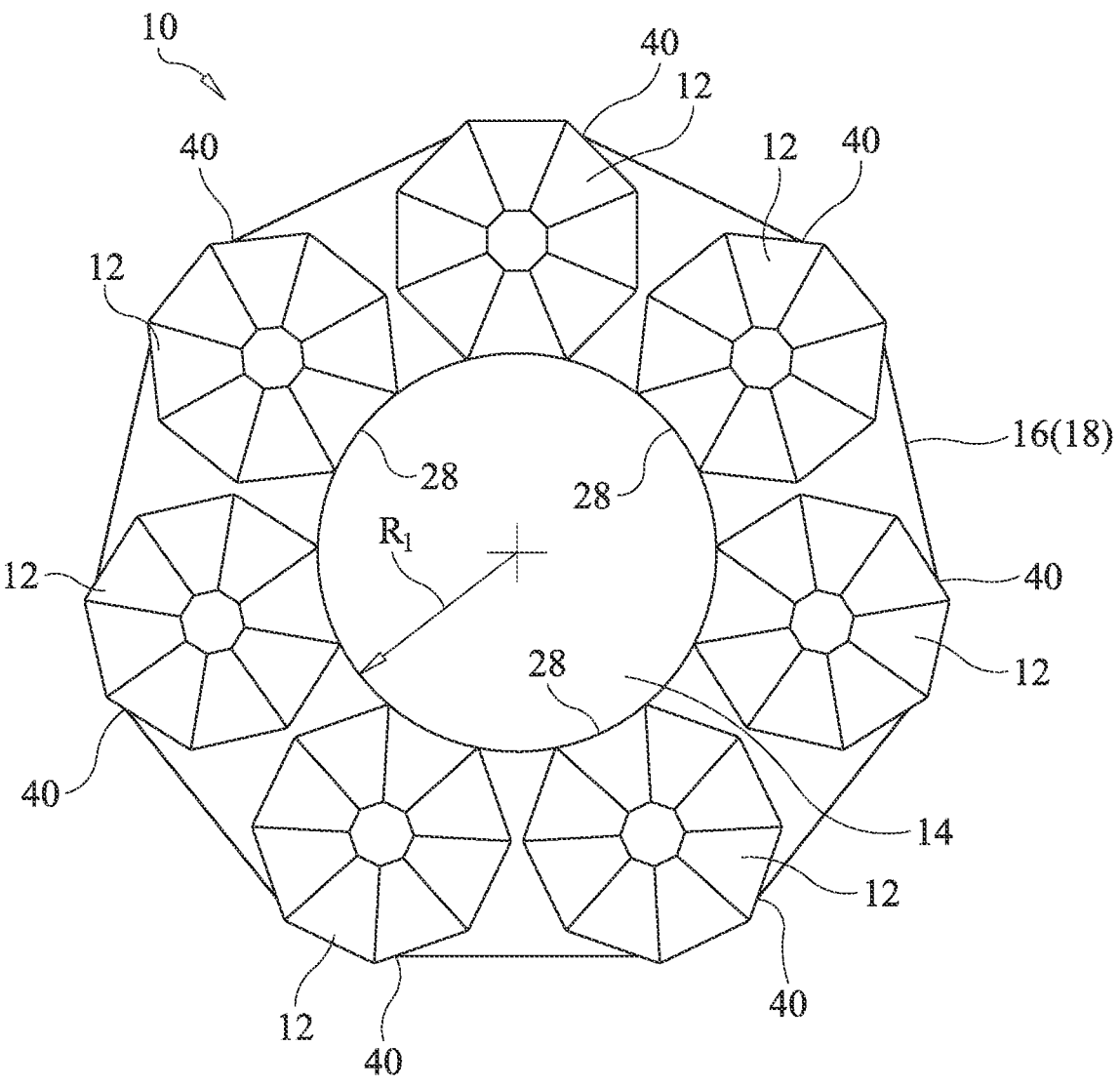
FIG. 3 is a top view of the conduit and a plurality of buoyant devices attached thereto via a pair of straps in accordance with the first embodiment.

The float assembly 10 can be used in any of a variety of applications where a slurry, liquid or fluid is to be pumped from beneath the surface S of a liquid L or slurry mixture to a location above the surface S of the liquid L or slurry mixture. In one example depicted in FIG. 1, the float assembly 10 is used with a floating vessel or boat B that is on the surface of a body of water with the liquid L such as a river or canal where, for example, a dredging operation is being conducted. Slurry from the bottom of the river or canal is pumped through a pipe 14 to the boat B and then further to a shoreline (not shown) along the river or canal. An outer surface of the pipe 14 (also referred to as a conduit) has at least a portion thereof having a cylindrically shape. The outer surface of the pipe 14 also defines a pipe radius $R_1$, as shown in FIG. 3. While a pipe is illustrated herein, it can be understood that the pipe can be any suitable conduit.

Figure 4:
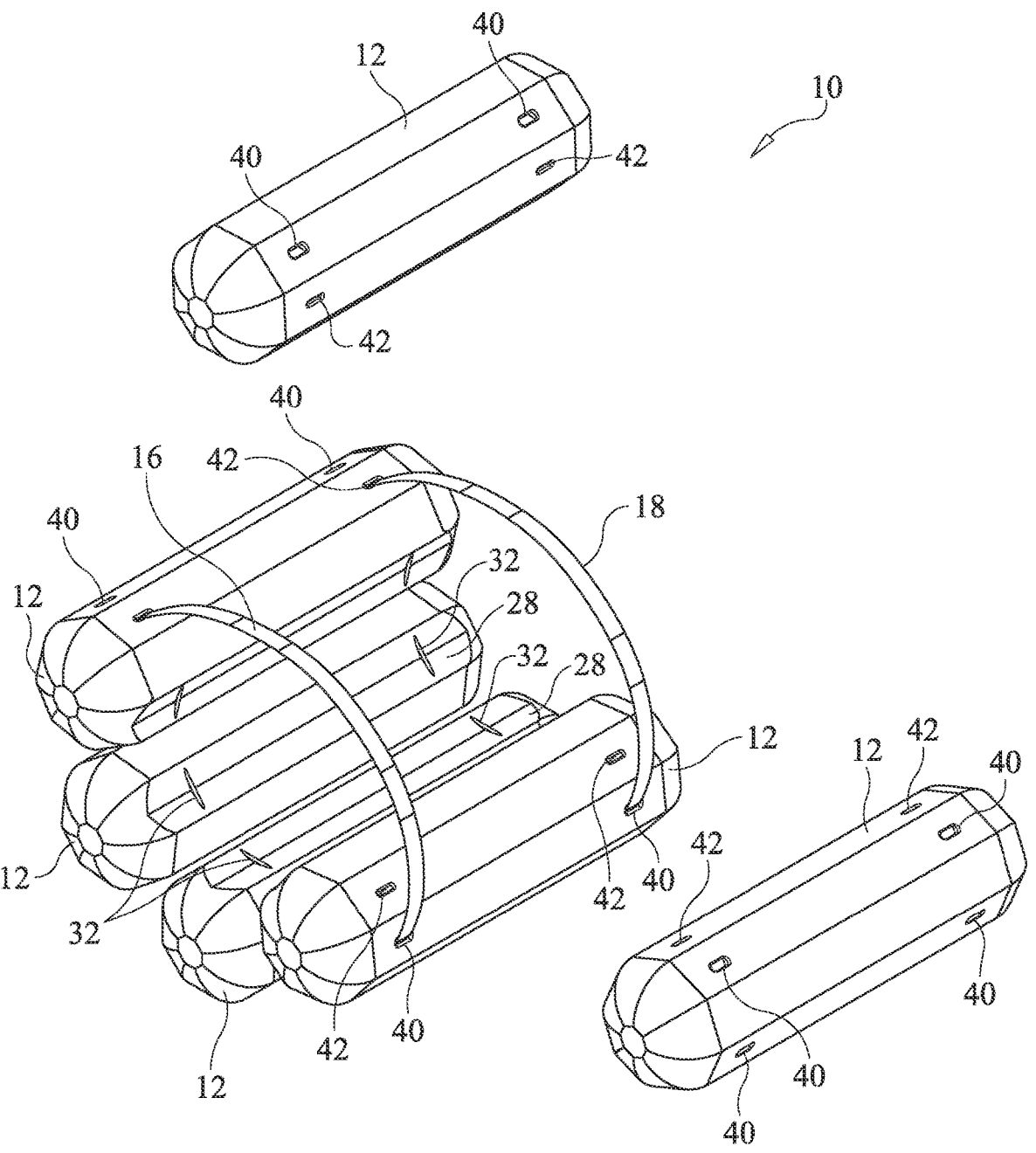
FIG. 4 is an exploded view of the plurality of buoyant devices and the pair of straps with the conduit removed in accordance with the first embodiment

An upper portion of the pipe 14 is preferably kept near the surface S of the liquid L by one or more of the buoyant devices 12, as shown in FIG. 1. As shown in FIGS. 2-4, a plurality of the buoyant devices 12 are attached to the pipe 14 via straps 16 and 18, in a manner described further below following a description of one of the buoyant devices 12.

In the first embodiment shown in FIGS. 5-12 and described below, one or a plurality of buoyant or float devices 12 can be used with a single pipe 14. Each of the plurality of the buoyant devices 12 are identical to one another. Therefore, description of one of the buoyant devices 12 applies to all of the plurality of the buoyant devices 12 depicted in FIGS. 1-4.

Figure 8:
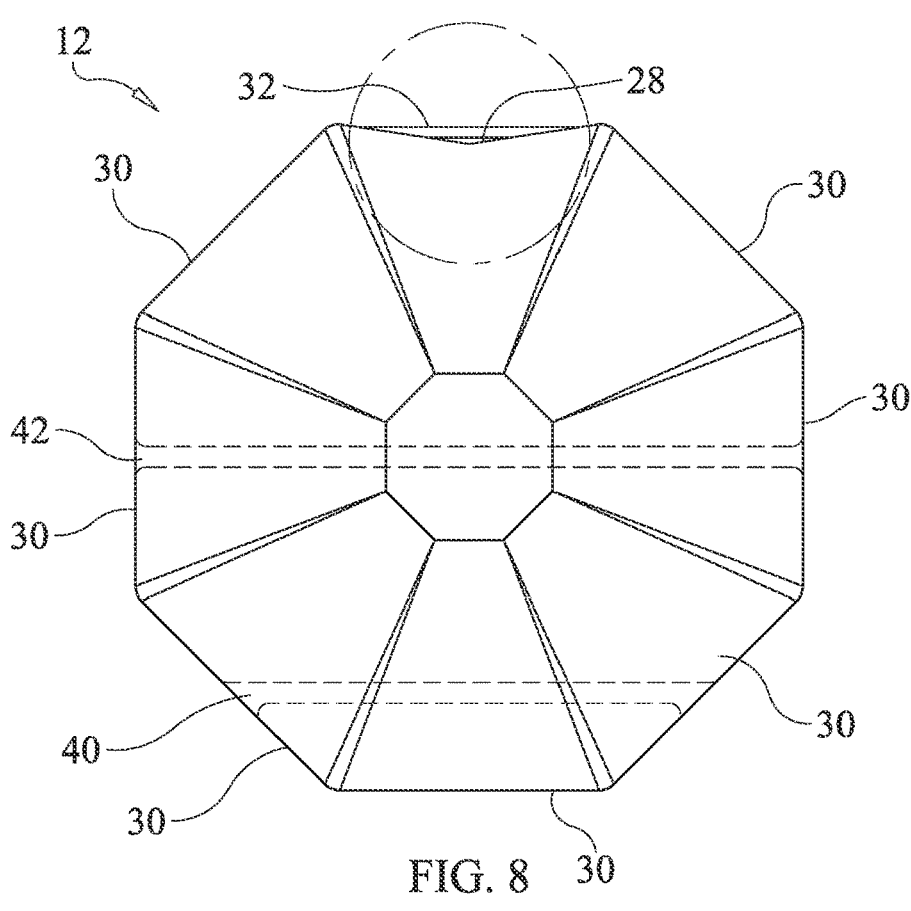
FIG. 8 is an end view of the buoyant device depicted in FIG. 5 showing the first end, the concaved area and one of projections within the concaved area in accordance with the first embodiment.
Figure 9:
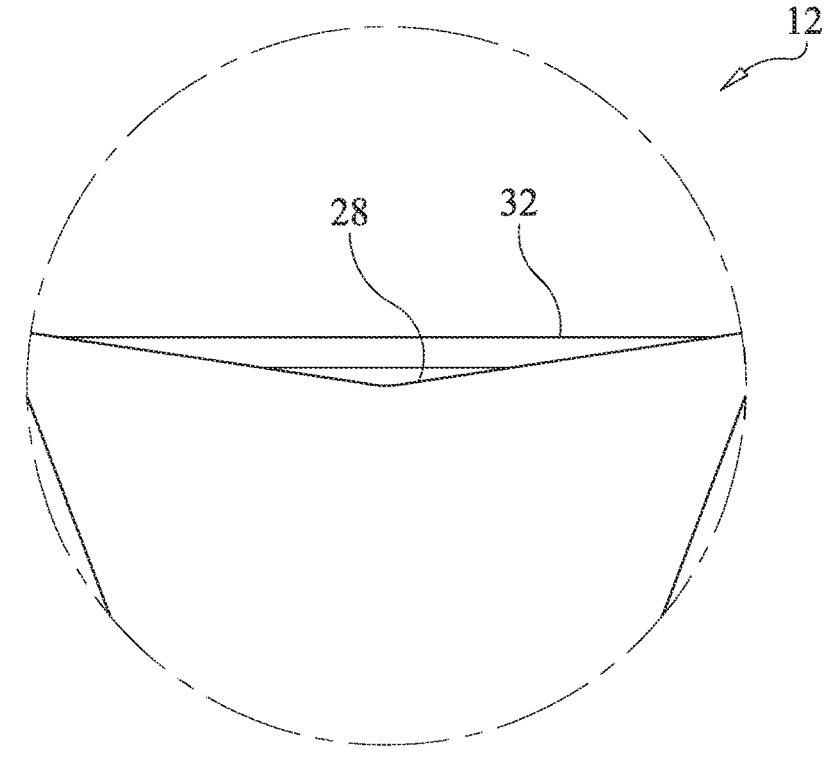
FIG. 9 is an enlarged end view of the buoyant device depicted in FIG. 8 showing only the concaved area and one of projections within the concaved area in accordance with the first embodiment.
Figures 10, 11, 12:
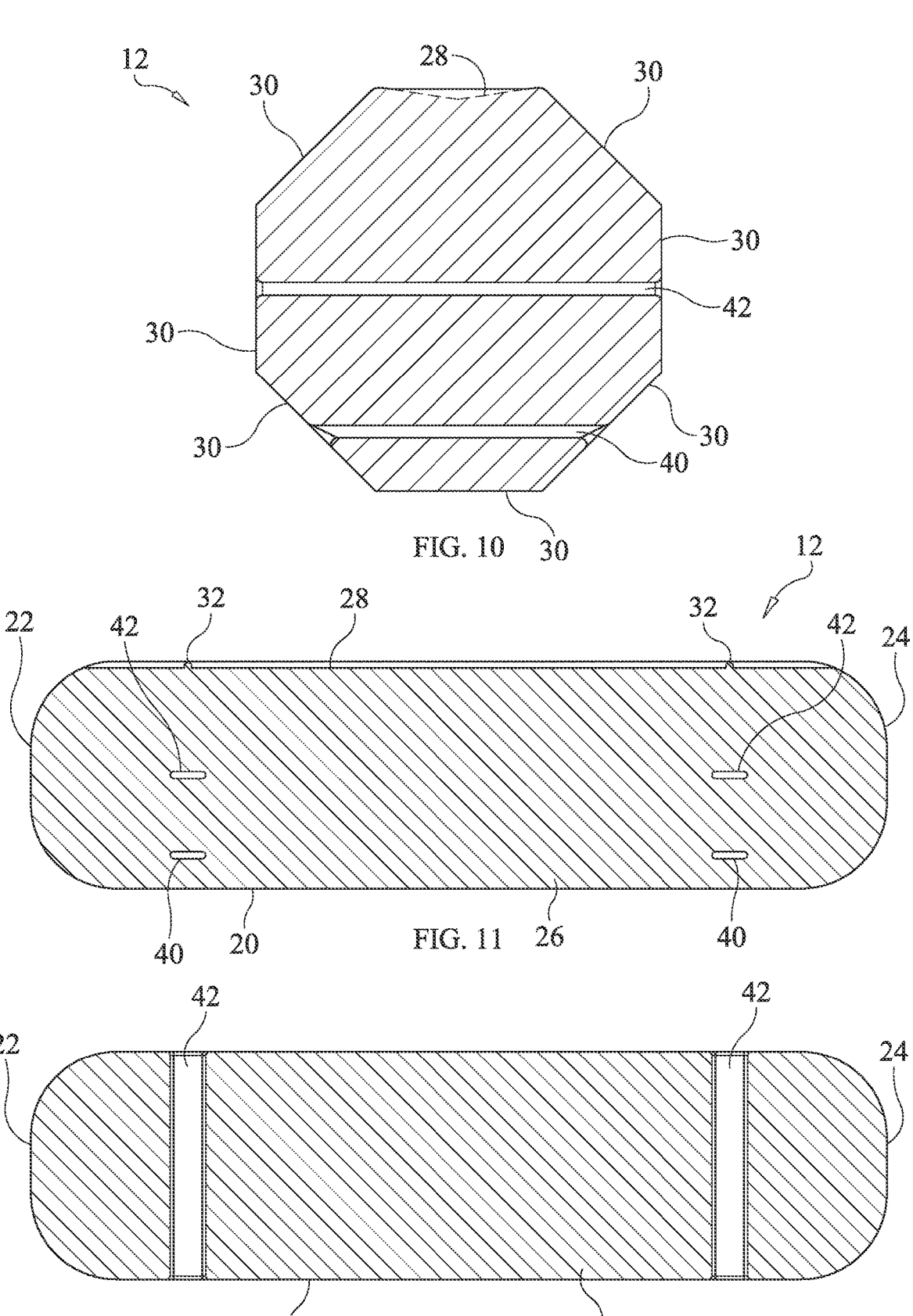
FIG. 10 is a cross-sectional view of the buoyant device taken along the line 10-10 in FIG. 7 showing the first and second strap receiving tunnels that extend through the buoyant device in accordance with the first embodiment.
FIG. 11 is a cross-sectional view of the buoyant device taken along the line 11-11 in FIG. 6 showing the first and second strap receiving tunnels, the concaved area and the pair of projections within the concaved area in accordance with the first embodiment.
FIG. 12 is a cross-sectional view of the buoyant device taken along the line 12-12 in FIG. 7 showing the second strap receiving tunnels that extend through the buoyant device in accordance with the first embodiment.
Figures 15, 16:
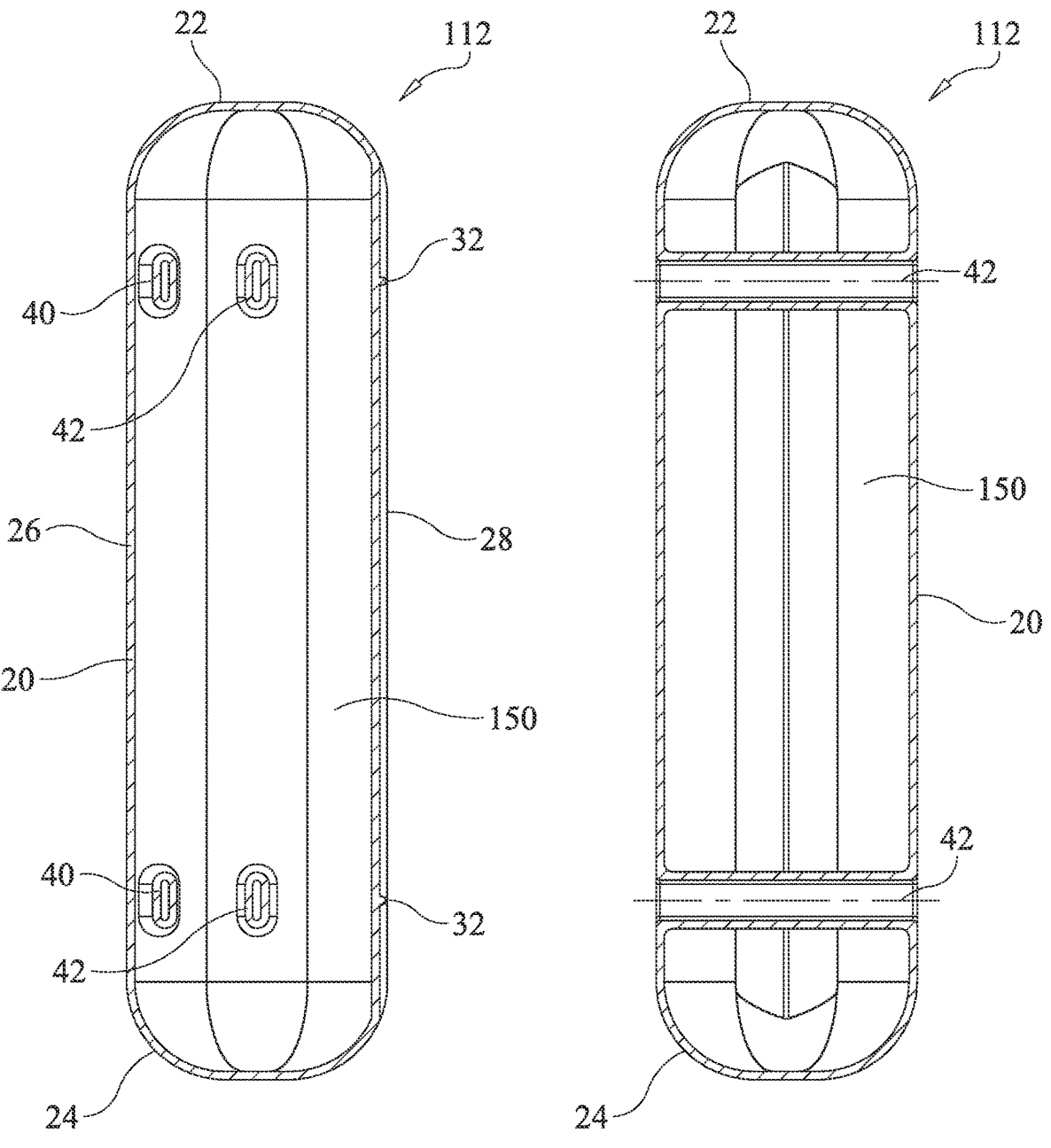
FIG. 15 is a cross-sectional view of the buoyant device taken along the line 15-15 in FIG. 13 showing a hollow interior of the buoyant device, the first and second strap receiving tunnels, the concaved area and the pair of projections within the concaved area in accordance with the second embodiment.
FIG. 16 is a cross-sectional view of the buoyant device taken along the line 16-16 in FIG. 14 showing the hollow interior of the buoyant device and the second strap receiving

As shown in FIGS. 5-12, the buoyant device 12 has an outer surface 20 with a first end portion 22, a second end portion 24 and an elongated portion 26. The elongated portion 26 extends from the first end portion 22 to the second end portion 24. The elongated portion 26 has an overall shape that resembles a cylinder when viewed from a distance. The cylinder shape is interrupted by a concaved section 28. In the first embodiment, the resemblance to a cylinder of the elongated portion 26 is achieved with the outer surface 20 having an octagonal shape with eight sections including seven flat sections 30, as shown in FIGS. 8 and 10. The last section of the eight sections that define the outer surface 20 in the first embodiment is the concaved section 28.

The first end portion 22 and the second end portion 24 of the outer surface 20 of the buoyant device 12 has an overall semi-spherical shape, as viewed from a distance. However, like the elongated portion 26, each of the first and second end portions 22 and 24 include eight separate sections that curve inward to define the overall semi-spherical shape.

The concaved section 28 defines a shape that complements the outer radius $R_1$ (the pipe radius) of the pipe 14. Consequently, with the concaved section 28 being strapped in place against the outer surface of the pipe 14, the buoyant device 12 can attach to the pipe 14 without rotating with respect to the pipe 14.

Figure 5:
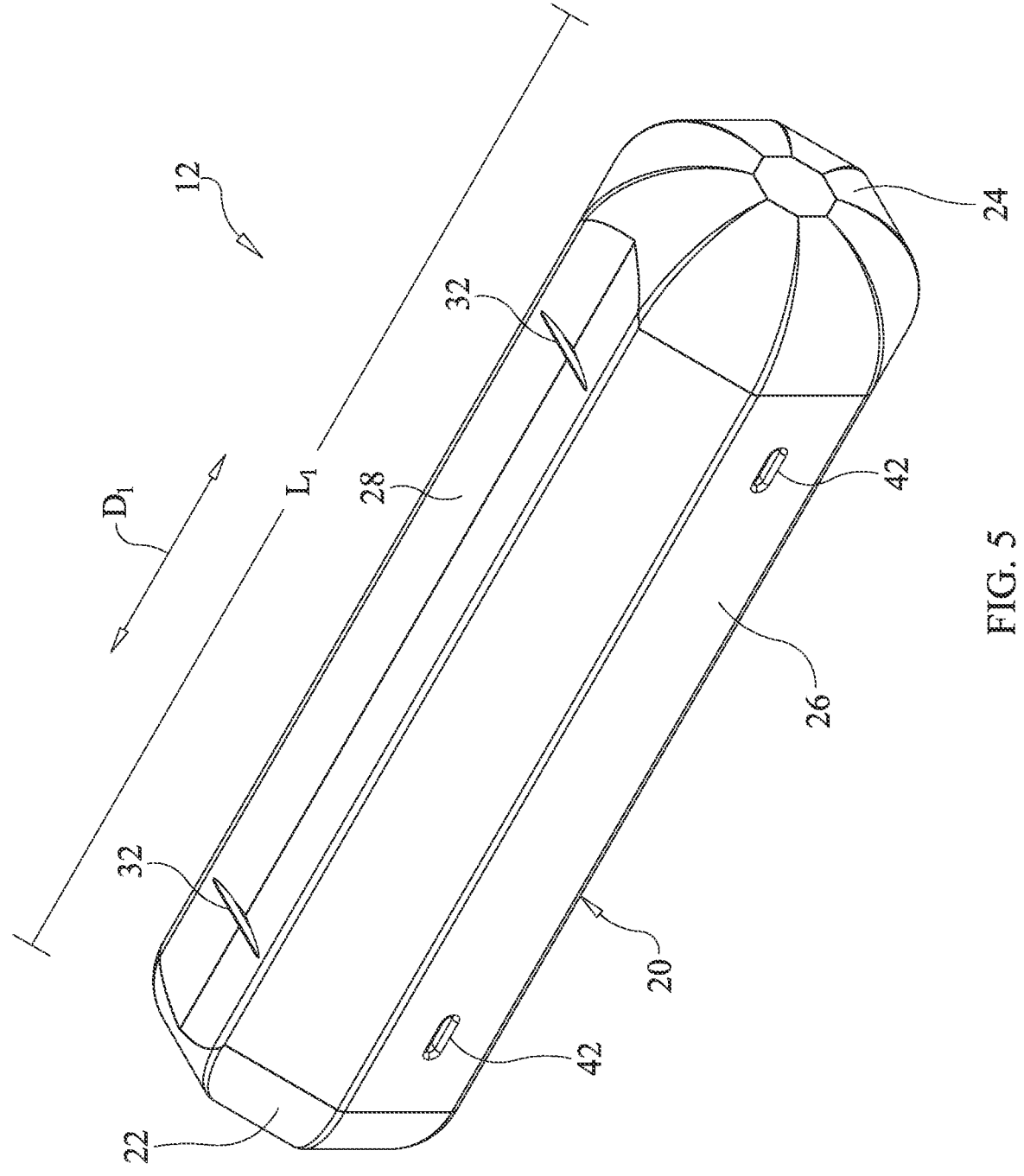
FIG. 5 is a perspective view of one of the buoyant devices showing an outer surface with a first end, a second end and an elongated portion that includes a concaved area and a pair of projections within the concaved area in accordance with the first embodiment.
Figures 6, 7:
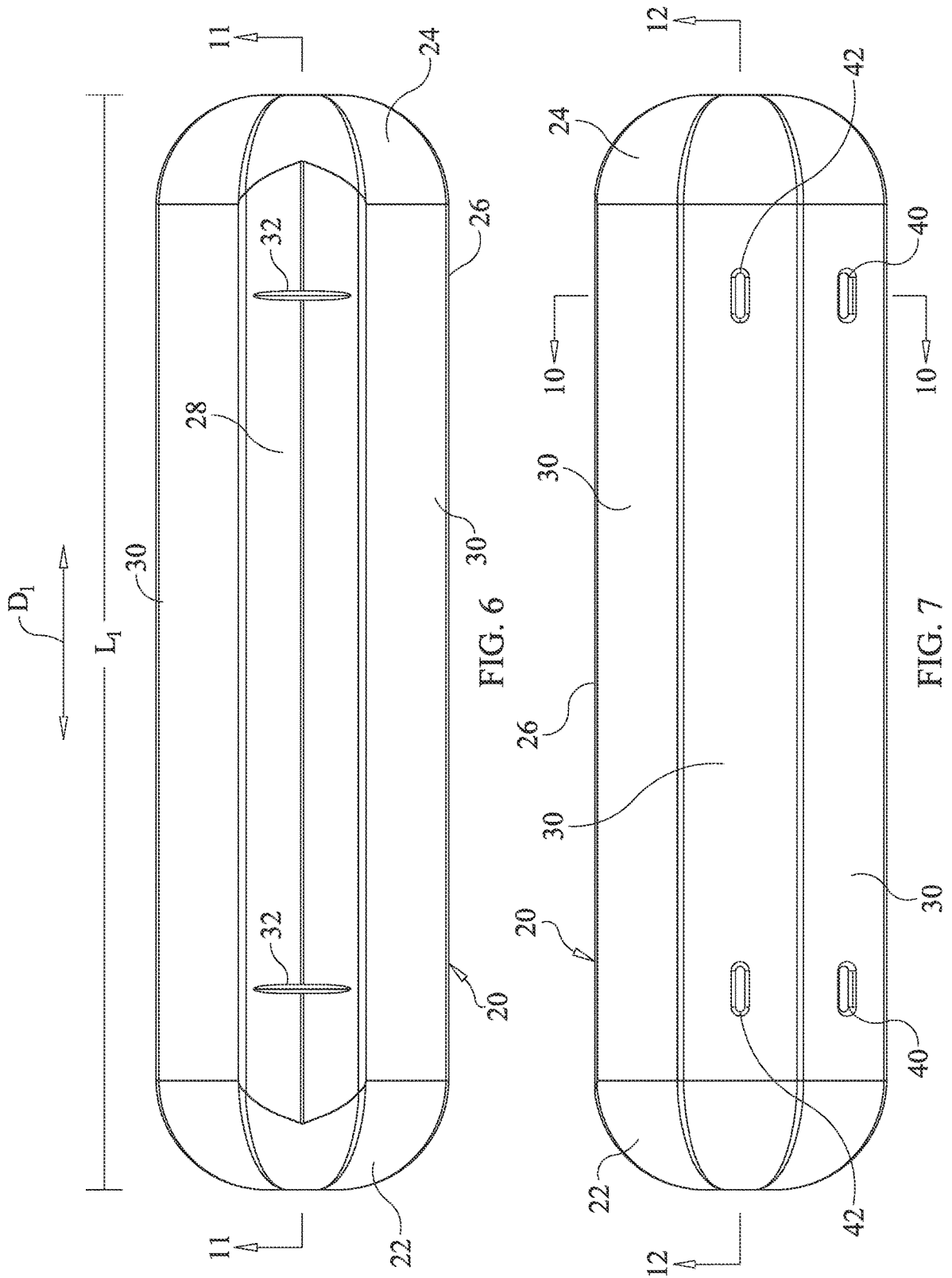
FIG. 6 is a first side view of the buoyant device depicted in FIG. 5 showing the outer surface, the first end, the second end, the elongated portion, the concaved area and the pair of projections within the concaved area in accordance with the first embodiment.
FIG. 7 is a second side view of the buoyant device depicted in FIG. 5 showing the outer surface, the first end, the second end, and first and second strap receiving tunnels in accordance with the first embodiment.

The buoyant device 12 has an overall length $L_1$ measured in a lengthwise direction $D_1$ of the buoyant device 12, as shown in FIGS. 5 and 6. The concaved section 28 includes at least one protrusion 32 and preferably two protrusions 32 that are dimensioned and shaped to contact the pipe 14 preventing longitudinal movement therebetween with the buoyant device 12 strapped to the pipe 14. Both of the protrusions 32 extend in directions perpendicular to the lengthwise direction $D_1$ of the buoyant device 12, as shown in FIG. 6.

As shown in FIGS. 10-12, the buoyant device 12 is not hollow in the first embodiment. Rather, the buoyant device 12 is filled with a foam material, such as, for example, expandable polyurethane, polystyrene or other light weight material that ensures buoyancy of the buoyant device 12. The outer surface 20 of the buoyant device 12 is defined an outer wall of the buoyant device 12. The outer wall can be formed from metallic materials or by any of a variety of plastic or polymers materials suitable for use in marine environments.

As shown in FIGS. 4-5, 7-8 and 10-12, the buoyant device 12 includes a pair of first strap receiving tunnels 40 and a pair of second strap receiving tunnels 42. The first strap receiving tunnels 40 extend between flat sections 30 located proximate an opposite side of the buoyant device 12 from the concaved section 28. The first strap receiving tunnels 40 are parallel to one another and parallel to the projections 32.

The pair of second strap receiving tunnels 42 extend through the buoyant device 12 and are centered with respect thereto, as shown in cross-section in FIGS. 8 and 10. The second strap receiving tunnels 42 are parallel to the first strap receiving tunnels 40 and spaced apart therefrom.

As shown in FIGS. 3 and 4, the straps 16 and 18 are installed to the buoyant devices 12 such that the strap 16 extends through one of the first strap receiving tunnels 40 in each of the plurality of buoyant devices 12 and the strap 18 extends through the other of the first strap receiving tunnels 40 in each of the plurality of buoyant devices 12. The plurality of buoyant devices 12 are tightened to the pipe 14 such that the straps 16 and 18 press the projections 32 onto the outer surface of the pipe 14. The straps 16 and 18 are then tightened. Once the straps 16 and 18 are tightened, contact between the projections 32 and the pipe 14 ensure that the plurality of buoyant devices 12 to not move in the lengthwise direction $D_1$ relative to the pipe 14. Further, since the pipe 14 extends into each of the concaved sections 28 of the buoyant devices 12, the straps 16 and 18 prevent rotation of the buoyant devices 12 relative to each other. As well, the straps 16 and 18 extending through the first strap receiving tunnels 40 further wrap around all of the buoyant devices 12 holding them together and in place about the pipe 14.

The second strap receiving tunnels 42 can be used in applications where fewer numbers of buoyant devices 12 are used, as is shown in the embodiments depicted in FIGS. 25-28 and described in greater detail below.

Second Embodiment

Referring now to FIGS. 13-16, a buoyant device 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The buoyant device 112 is basically the same (from the outside) as the buoyant device 12 of the first embodiment, except that the buoyant device 112 has a hollow interior 150. More specifically, the buoyant device 112 includes the outer surface 20 with the first end 22, the second end 24, the elongated portion 26, the concaved section 28 and the projections 32. The buoyant device 112 further includes the first strap receiving tunnels 40 and the second strap receiving tunnels 42, as described above with respect to the first embodiment. In the first embodiment, the buoyant device 12 is not hollow. In the second embodiment, the buoyant device 112 is hollow.

Third Embodiment

Referring now to FIGS. 17-19, a buoyant device 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The buoyant device 212 is very similar to the buoyant device 12 of the first embodiment, except that the buoyant device 212 has a smooth outer surface 220. The buoyant device 212 includes an outer surface 220 with a first end 222, a second end 224 and an elongated portion 226. The outer surface 220 is dimensioned and shaped in a manner similar to the outer surface 20 of the first embodiment, except that the outer surface 220 is smooth and continuous except for the inclusion of the concaved section 28 and the projections 32. The concaved section 28 and the projections 32 are as described in the first embodiment. Similarly, the first end 222 has an overall shape similar to the first end 22 but is smooth. As well, the second end 224 has an overall shape similar to the second end 22 of the first embodiment but is smooth.

The buoyant device 212 further includes the first strap receiving tunnels 40 and the second strap receiving tunnels 42.

Fourth Embodiment

Referring now to FIGS. 20-24, a buoyant device 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The buoyant device 312 of the fourth embodiment has some features common with the first embodiment. However, in the fourth embodiment, the buoyant device 312 has an outer surface 320 that includes a first end 322, a second end 324 and an elongated portion 326. The buoyant device 312 further includes the concaved section 28 and the projections 32 of the first embodiment. The buoyant device 312 further includes at least one the first strap receiving tunnels 40 and at least one of the second strap receiving tunnels 42, as described in the first embodiment.

The first end 322 includes a pair of attachment projections 360 that extend from the elongated portion 326. The second end 324 includes a pair of recesses 362 that are shaped and dimensioned to receive the pair of attachment projections 360. As shown in FIG. 20, the second end 324 of the buoyant device 312 can be attached to the first end 322 of a second of the buoyant device 312 via a pair of attachment projections 360 of the second of the buoyant devices 312 being inserted into the pair of recesses 362 at the second end of the first of the buoyant device 312. The strap 16 is inserted the second strap receiving tunnels 42 and the strap 18 is fitted into openings of the projections 360 and thereafter into openings (equivalent to another strap receiving tunnel) in the recesses 362 fixing the two of the buoyant devices 312 together.

Thus a plurality of the buoyant devices 312 can be attached about the outer surface of the pipe 14, and at least pairs of buoyant devices 312 can be attached to one another end to end. It should be understood that many buoyant devices 312 can be attached to one another end to end depending on the length of the pipe 14 and the buoyancy requirements of the float assembly 10.

Fifth Embodiment

Referring now to FIG. 25, a float assembly in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, a plurality of the buoyant devices 12 are installed about the pipe 14. The diameter of the pipe 14 and the dimensions of the buoyant devices 12 can, in certain circumstances, be used determine how many buoyant devices 12 are needed. In the fifth embodiment, four of the buoyant devices 12 are strapped about the pipe 14 with straps 16 being installed in the strap receiving tunnels 42, as shown in FIG. 25.

Sixth Embodiment

Referring now to FIG. 26, a float assembly in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, a plurality of the buoyant devices 12 are installed about the pipe 14. In the sixth embodiment, five of the buoyant devices 12 are strapped about the pipe 14 with straps 16 being installed in the strap receiving tunnels 42, as shown in FIG. 26.

Seventh Embodiment

Referring now to FIG. 27, a float assembly in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the relative diameter of the pipe 14 is larger than in the sixth embodiments. A plurality of the buoyant devices 12 are installed about the pipe 14. In the seventh embodiment, five of the buoyant devices 12 are again strapped about the pipe 14 with straps 16 being installed in the strap receiving tunnels 42, as shown in FIG.

26. Alternatively, the straps 16 can be installed in the strap receiving tunnels 40 (not shown in FIG. 27).

Eighth Embodiment

Referring now to FIG. 28, a float assembly in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, the relative diameter of the pipe 14 is larger than in the sixth and seventh embodiments. A plurality of the buoyant devices 12 are installed about the pipe 14. In the eighth embodiment, six of the buoyant devices 12 are strapped about the pipe 14 with straps 16 being installed in the strap receiving tunnels 40, as shown in FIG. 28.

Ninth Embodiment

Referring now to FIGS. 29-34, a buoyant device 412 in accordance with a nineth embodiment will now be explained. In view of the similarity between the first and nineth embodiments, the parts of the nineth embodiment that are identical to the parts of the first embodiment will be given the same reference numerals as the parts of the first embodiment. Moreover, the descriptions of the parts of the nineth embodiment that are identical to the parts of the first embodiment may be omitted for the sake of brevity.

The buoyant device 412 in the nineth embodiment has an outer surface 420 with a first end portion 422, a second end portion 424 and an elongated portion 426. Each of the first end portion 422 and the second end portion 424 of the outer surface 420 of the buoyant device 412 has a tapering semi-conical shape, as shown in FIG. 29.

The elongated portion 426 extends from the first end portion 422 to the second end portion 424. The elongated portion 426 has an overall shape that resembles a wedge or a piece of pie with a bite taken out of an inner end thereof, as viewed from either end thereof or in cross-section, as shown in FIGS. 32, 33 and 34. Put another way, the first end portion 422 and the second end portion 424 of the outer surface 420 of the buoyant device 412 has wedge-like shape, as viewed in perspective. An inner area of the buoyant device 412 defines a concaved section 428 that is curved when viewed from either end, as shown in FIGS. 32-34. The first end portion 422 and the second end portion 424 of the outer surface 420 are also tapering surfaces, as viewed from the perspective, top and side views as in FIGS. 29, 30 and 31, respectively.

The concaved section 428 extends from the first end portion 422 to the second end portion 424. The concaved section 428 has edges 428a that define a shape that complements an outer radius of the conduit 14 with the buoyant device 428 attached to the conduit 14, as described below.

The outer surface 420 of the elongated portion 426 has opposing side surface sections 440, a convex section 442 and the concaved section 428. The side surface sections 440 are generally flat or planar, as shown in FIGS. 29 and 32-34. Each side sections 440 extend from a corresponding edge 428a of the concaved section 428 to a corresponding edge of the convex section 442. The convex section 442 extends parallel to the concaved section 428. The side sections 440 are angularly offset from one another defining an acute angle $\alpha$ therebetween, as shown in FIG. 33. The acute angle $\alpha$ can have any of a variety of values, depending upon the desired shape and purpose of the buoyant device 412. In the depicted embodiment the acute angle $\alpha$ is between 45 and 55 degrees but is preferably approximately 50 (plus or minus one) degrees.

The buoyant device 412 is shaped and configured to attach to the conduit 14 with edges 428a of the concaved section 428 contacting the conduit 14 as is shown in FIGS. 37-38, 40-41, 43-44 and 46-47, and described further below.

The concaved section 428 defines a part-cylindrical or curved shape that complements or is smaller than the outer radius $R_1$ (the pipe radius) of the pipe 14 (FIGS. 1 and 3). Consequently, with the buoyant device 412 being strapped in place against the outer surface of the conduit 14, the edges 428a of the concaved section 428 of the buoyant device 12 can press against the pipe 14 (for larger pipes 14) assisting in preventing rotating or movement along and with respect to the pipe 14. For smaller diameter pipes, tightening a strap $S_1$ (described below) can be sufficient to retain the buoyant device(s) 412 to the pipe 14, as described further below.

The convex section 442 extends from the first end section 422 to the second end portion 424 but is interrupted by at least one strap receiving recess 450a. Preferably, convex section 442 includes three strap receiving recesses 450a, 450b and 450c. Each of the strap receiving recesses 450a, 450b and 450c extends in a direction $D_1$ or parallel to the direction $D_1$ that perpendicular to a lengthwise direction $D_L$ of the convex section 442 and the buoyant device 412. A bottom surface of each of the strap receiving recesses 450a, 450b and 450c has an arcuate shape that has a radius $R_2$ smaller that a radius $R_3$ defined by the curvature of the convex section 442, as shown in FIG. 32. The strap receiving recesses 450a and 450c are identical in shape and dimensions. The strap receiving recess 450b is identical to the recesses 450a and 450b except that a central area of the recess 450b includes a bridge portion 450d that covers a small portion of the recess 450b defining a tunnel within the recess 450b, as shown in FIGS. 29, 30, 31 and 32. When a strap $S_1$ is inserted into the recess 450b, the strap $S_1$ is more readily retained within the recess 450b by the bridge portion 450d thereby making attachment of the buoyant device 12 to the pipe 14.

As shown in FIGS. 29-31, each of the first end portion 422 and the second end portion 424 includes an arcuate shaped flat surface section 456. The arcuate shaped flat surface section 456 is provided for installations where buoyant devices 412 are installed end to end along the lengthwise direction $D_L$ of the pipe 14.

As is shown in FIGS. 32-34, the buoyant device 412 can have hollow interior H. The buoyant device 412 can be made of any of a variety of materials, such as metal, metal alloys, plastic or polymer materials and/or reinforced fiber materials such as fiberglass, or combinations thereof.

As shown in the installation configurations below in FIGS. 35-53, the buoyant device 412 can be installed to various sized conduits having a variety of diameters (and radii). For example, with a large diameter conduit 14, seven (7) or more buoyant devices 412 can be strapped to the conduit 14 (also referred to as the pipe P). For conduits having smaller diameters, one, two, three, four, five or six buoyant devices 412 can be strapped together around a conduit, as described in greater detail below.

As shown in FIG. 35, the conduit 14 has a cylindrically shaped outer surface that defines the pipe radius $R_1$. A plurality of the buoyant devices 412 can be positioned around the pipe 14 for subsequent installation thereto. In the depicted embodiment, the pipe radius $R_1$ is such that seven of the buoyant devices 412 can be positioned around the pipe 14 with the buoyant devices 412 being slightly spaced apart from one another. In FIG. 36-37, the straps $S_1$ have been installed into the recesses 250a, 250b and 250c and tightened securing the buoyant devices 412 to the pipe 14 (also referred to as pipe $P_1$). As shown in FIG. 37, once tightened to the pipe $P_1$ the seven buoyant devices 412 are slightly spaced apart from one another in a circumferential direction defining a plurality of gaps G therebetween.

As shown in FIG. 37, the concaved sections 428 of each the elongated portion 426 of the outer surface 420 of each buoyant device 412 is such that corresponding portions of the pipe $P_1$ extends into the concaved sections 428.

In FIG. 38, the plurality of buoyant devices 412 are secured to the outer surface of a pipe $P_2$ that has an outer radius (diameter) that slightly is larger than the radius of the pipe $P_1$. Consequently, the gaps $G_2$ are larger than the gaps G of the assembly of buoyant devices 412 shown in FIG. 37. Further, the adjacent surfaces of the buoyant devices 412 along the gaps G and $G_2$ are approximately parallel to one another.

In FIGS. 39 and 40, a plurality of buoyant devices 412 (six buoyant devices 412) are secured to the outer surface of a pipe $P_3$ that has an outer radius (diameter) that is smaller than the radius of the pipes $P_1$ and $P_2$. Consequently, the gaps $G_3$ in FIG. 40 differ from the gaps G and $G_2$ in FIGS. 37 and 38 in that the adjacent surfaces of the buoyant devices 412 along the gap $G_3$ are not parallel to one another. Rather, the gap G3 have a triangular shape, as shown in FIG. 40.

In FIG. 41, a plurality of buoyant devices 412 are secured to the outer surface of a pipe $P_4$ that has an outer radius (diameter) that is slightly larger than the radius of the pipe $P_3$. Consequently, the gaps $G_4$ FIG. 41 differ from the gaps G, $G_2$ and $G_3$ in FIGS. 39 and 40 in that the adjacent surfaces of the buoyant devices 412 along the gap $G_3$ are almost parallel to one another.

In FIGS. 42 and 43, a plurality of buoyant devices 412 (five buoyant devices 412) are secured to the outer surface of a pipe $P_5$ that has an outer radius (diameter) that is smaller than the radius of the pipes $P_3$ and $P_4$. Consequently, the gaps $G_5$ in FIG. 43 differ from other gaps in that the adjacent surfaces of the buoyant devices 412 along the gap $G_5$ are again not parallel to one another. Rather, the gap $G_5$ have a triangular shape, as shown in FIG. 43.

In FIG. 44, a plurality of buoyant devices 412 (five buoyant devices 412) are secured to the outer surface of a pipe $P_4$ that has an outer radius (diameter) that is slightly larger than the radius of the pipe $P_3$. Consequently, the gaps $G_4$ in FIG. 41 differ from the gaps G, $G_2$ and $G_3$ in FIGS. 39 and 40 in that the adjacent surfaces of the buoyant devices 412 along the gap $G_3$ are almost parallel to one another.

In FIGS. 45 and 46, a plurality of buoyant devices 412 (four buoyant devices 412) are secured to the outer surface of a pipe $P_7$ that has an outer radius (diameter) that is smaller than the radius of the pipes $P_5$ and $P_6$. Straps $S_1$ secure the buoyant devices 412 to one another and surround the pipe $P_7$. Consequently, gaps $G_7$ in FIG. 46 differ in dimensions from other gaps in that outer most portions of the adjacent surfaces of the buoyant devices 412 along the gap $G_7$ are further apart from one another than in FIGS. 36-44 and again not parallel to one another. Rather, the gaps $G_7$ have triangular shapes, as shown in FIG. 46.

In FIG. 47, a plurality of buoyant devices 412 (four buoyant devices 412) are secured to the outer surface of a pipe $P_8$ that has an outer radius (diameter) that is slightly larger than the radius of the pipe $P_7$. Consequently, the gaps $G_8$ in FIG. 47 differ from the gaps $G_4$, $G_5$ and $G_6$.

In FIGS. 48 and 49, a plurality of buoyant devices 412 (three buoyant devices 412) are secured to the outer surface of a pipe $P_9$ that has an outer radius (diameter) that is smaller than the radius of the pipes $P_7$ and $P_8$. Straps $S_1$ secure the buoyant devices 412 to one another and surround the pipe $P_9$. Consequently, gaps $G_9$ in FIG. 49 differ in dimensions from other gaps in that outer most portions of the adjacent surfaces of the buoyant devices 412 along the gap $G_7$ are further apart from one another than in FIGS. 36-47 and again not parallel to one another. Rather, the gaps $G_9$ have large triangular shapes, as shown in FIG. 51.

In FIGS. 52 and 53, a single buoyant device 412 is secured to the outer surface of one pipe or a cluster of small pipes $P_{11}$ that has an outer radius (diameter) that is smaller than the radius of the pipe $P_{10}$. Straps $S_1$ secure the buoyant device 412 to the pipe $P_{11}$ clamping the buoyant devices 412 thereto.

As shown in FIGS. 54 and 55, the shape and dimensions of the buoyant device 412 are such that a plurality of the buoyant devices 412 can be easily and compactly laid onto a pallet or cargo carrier 470 without the need of cradles or special fixtures. Instead, each row of buoyant devices 412 include alternating ones with the convex surface section 442 facing upward and concaved section 428 facing upward. The side surface sections 400 are drawn against one another in a tight compact arrangement. Shipping straps $S_2$ tightly wrap around the plurality of buoyant devices 412 and the pallet or cargo carrier 470 keeping the plurality of buoyant devices 412 secure and easily moved for shipping.

Tenth Embodiment

Referring now to FIGS. 56-59, a buoyant device 412' in accordance with a tenth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

The buoyant device 412' in the tenth embodiment has all the features of the nineth embodiment such as the outer surface 420 with a first end portion 422, a second end portion 424 and an elongated portion 426. Each of the first end portion 422 and the second end portion 424 of the outer surface 420 of the buoyant device 412 has a tapering semi-conical shape, as shown in FIG. 56. The buoyant device 412' also includes the strap receiving recesses 450a, 450b and 450c.

However, as shown in FIGS. 57-59, the buoyant device 412' is not hollow in the tenth embodiment. Rather, the buoyant device 412' is filled with a highly buoyant foam material, such as, for example, expandable polyurethane, polystyrene or other light weight material that ensures buoyancy of the buoyant device 12. The outer surface 420 of the buoyant device 412' defines an outer wall 420 (outer surface) of the buoyant device 412'. The outer wall 420 can be formed from metallic materials or by any of a variety of plastic or polymers materials suitable for use in marine environments.

Eleventh Embodiment

Referring now to FIGS. 60-64, a buoyant device 412" in accordance with an eleventh embodiment will now be explained. In view of the similarity between the first and tenth embodiments, the parts of the eleventh embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

The buoyant device 412" in the eleventh embodiment has all the features of the nineth and tenth embodiments such as the outer surface 420 with a first end portion 422, a second end portion 424 and an elongated portion 426. Each of the first end portion 422 and the second end portion 424 of the outer surface 420 of the buoyant device 412 has a tapering semi-conical shape, as shown in FIG. 60. The buoyant device 412' also includes the strap receiving recesses 450a, 450b and 450c.

However, in the eleventh embodiment, the buoyant device 412" includes a plurality of recessed areas 480 that can be fitted with lights or beacons 482.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the float assembly. Accordingly, these terms, as utilized to describe the present invention should be interpreted relative to a vehicle equipped with the float assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A float arrangement, comprising:

a plurality of first and second floats each including a body portion having a first side surface and a second side surface, an inner surface, an outer surface, and at least one strap receiving recess which extends into the outer surface, the first and second side surfaces being generally planar and forming an acute angle therebetween, the inner surfaces being non-planar and having an inner radius between a first inner edge and a second inner edge, and the outer surfaces being non-planar and having an outer radius between a first outer edge and a second outer edge, the first side surface extending from the first inner edge to the first outer edge, the second side surface extending from the second inner edge to the second outer edge, the inner radius being smaller than the outer radius, the at least one strap receiving recess forming a recess in the first outer edge and the second outer edge, and the plurality of first and second floats arranged in a plurality of rows and columns, at least one row containing alternating first floats having the inner surface facing upwards and second floats having the outer surface facing upwards, such that the body portion of each of a plurality of the first floats is positioned laterally adjacent an inverted second float and vertically adjacent another first float, with the first side surface of each of the plurality of the first floats abutting a second side surface of the laterally adjacent and inverted second float, with the first outer edge of the first side surface of each of the first floats contacting the second side surface of the laterally adjacent second float at a midpoint along the second side surface between the second inner edge and the second outer edge of the second side surface such that the first outer edge is offset from the second inner edge and the second outer edge in the direction of the second side surface, with the first and second inner edges of the inner surface of multiple first floats contacting the outer surface of a vertically adjacent first float, and with at least one outer column of first floats or second floats having the respective at least one strap receiving recesses align vertically down the outer column.

2. The float arrangement in accordance with claim 1, wherein the plurality of first and second floats forms a stacked float shipping assembly.

3. The float arrangement in accordance with claim 1, wherein the plurality of first and second floats includes at least one column of a plurality of upright first floats.

4. The float arrangement according to claim 1, wherein the acute angle is between 45 and 55 degrees.

5. The float arrangement in accordance with claim 1, wherein the inner and outer surfaces for each float of the plurality of first and second floats are arcuate.

6. The float arrangement in accordance with claim 1, wherein the inner surface for each first and second float is concave and the outer surface for each first and second float is convex.

7. The float arrangement according to claim 1, wherein the at least one strap receiving recess for each first and second float extends across the outer surface from the first outer edge to the second outer edge in a direction perpendicular to a lengthwise direction of the outer surface.

8. The float arrangement according to claim 1, wherein each first and second float has a wedge-like shape as viewed from along a length thereof.

9. The float arrangement according to claim 1, wherein each first and second float has a hollow interior.

10. The float arrangement according to claim 1, wherein each first and second float is at least partially filled with a foam material.

11. A float arrangement, comprising a plurality of first and second floats arranged in a plurality of rows and columns, each of the plurality of first and second floats having a first side surface, a second side surface, an inner surface, an outer surface, and at least one strap receiving recess which extends into the outer surface, the first and second side surfaces being generally planar and forming an acute angle therebetween, the inner surfaces being non-planar and having an inner radius between a first inner edge and a second inner edge, and the outer surfaces being non-planar and having an outer radius between a first outer edge and a second outer edge, the first side surface extending from the first inner edge to the first outer edge, the second side surface extending from the second inner edge to the second outer edge, the inner radius being smaller than the outer radius, the at least one strap receiving recess forming a recess in the first outer edge and the second outer edge, and a first float of the plurality of first and second floats being positioned laterally adjacent an inverted second float of the plurality of first and second floats and vertically adjacent another first float of the plurality of first and second floats, such that the first side surface of the first float abuts the second side surface of the inverted second float with the first outer edge of the first side surface of the first float contacting the second side surface of the laterally adjacent second float at a midpoint along the second side surface between the second inner edge and the second outer edge of the second side surface such that the first outer edge is offset from the second inner edge and the second outer edge in the direction of the second side surface, with the first and second inner edges of the inner surface of the first float contacting the outer surface of the another first float, and with at least one outer column of first floats or second floats having the respective at least one strap receiving recesses align vertically down the outer column.

12. The float arrangement in accordance with claim 11, wherein the plurality of first and second floats forms a stacked float shipping assembly.

13. The float arrangement in accordance with claim 11, wherein the plurality of first and second floats includes at least one row of a plurality of upright first floats and a plurality of inverted second floats disposed in an alternating configuration, the first float being one of the plurality of upright floats and the second float being one of the plurality of inverted floats.

14. The float arrangement in accordance with claim 11, wherein
the plurality of first and second floats includes at least one column of a plurality of upright first floats, the first and the another first floats being floats of the plurality of upright floats.

15. The float arrangement according to claim 11, wherein the acute angle is between 45 and 55 degrees.

16. The float arrangement in accordance with claim 12, wherein
the first and second end surfaces for each first and second float are arcuate.

17. The float arrangement in accordance with claim 11, wherein
the inner surface for each first and second float is concave and the outer surface for each first and second float is convex.

18. The float arrangement according to claim 11, wherein
the at least one strap receiving recess for each first and second float extends across the outer surface from the first outer edge to the second outer edge in a direction perpendicular to a lengthwise direction of the outer surface.

19. The float arrangement according to claim 11, wherein
each first and second float has a wedge-like shape as viewed from along a length thereof.

20. The float arrangement according to claim 11, wherein
the first and second floats are identical besides being positioned in inverted form with respect to each other.

\* \* \* \* \*